United States Patent [19]
Van Slyke

[11] Patent Number: 5,634,984
[45] Date of Patent: Jun. 3, 1997

[54] METHOD FOR CLEANING AN OIL-COATED SUBSTRATE

[75] Inventor: Donald C. Van Slyke, Brea, Calif.

[73] Assignee: Union Oil Company of California, El Segundo, Calif.

[21] Appl. No.: 210,144

[22] Filed: Mar. 17, 1994

Related U.S. Application Data

[63] Continuation-in-part of Ser. No. 172,429, Dec. 22, 1993, abandoned.

[51] Int. Cl.⁶ ............... B08B 3/04; B08B 3/08; C23G 5/02; C23G 5/06
[52] U.S. Cl. .................... 134/40; 134/26
[58] Field of Search ..................... 134/26, 40

[56] References Cited

U.S. PATENT DOCUMENTS

| | | | |
|---|---|---|---|
| 3,688,845 | 9/1972 | Messenger | 166/291 |
| 3,849,316 | 11/1974 | Motley et al. | 252/8.5 |
| 4,640,719 | 2/1987 | Hayes et al. | 134/40 |
| 4,645,608 | 2/1987 | Rayborn | 252/8.51 |
| 4,707,293 | 11/1987 | Ferro | 252/174 |
| 4,978,461 | 12/1990 | Peiffer et al. | 252/8.511 |
| 5,146,938 | 9/1992 | Lutener et al. | 134/32 |
| 5,234,577 | 8/1993 | Van Slyke | 208/13 |
| 5,264,045 | 11/1993 | Zofchak | 134/40 |

FOREIGN PATENT DOCUMENTS

| | | |
|---|---|---|
| 60372A | 9/1982 | European Pat. Off. . |
| 0137474 | 4/1985 | European Pat. Off. . |
| 164467 | 12/1985 | European Pat. Off. . |
| 0171999 | 2/1986 | European Pat. Off. . |
| 0259111 | 3/1988 | European Pat. Off. . |
| 426942 | 5/1991 | European Pat. Off. . |
| 0449257 | 10/1991 | European Pat. Off. . |
| 0474413 | 3/1992 | European Pat. Off. . |
| 0474053 | 3/1992 | European Pat. Off. . |
| 261416 | 10/1988 | Germany . |
| 261417 | 10/1988 | Germany . |
| 268971 | 6/1989 | Germany . |
| T035008 | 5/1985 | Hungary . |
| 51-097541 | 8/1976 | Japan . |
| 52-072369 | 6/1977 | Japan . |
| 56-115397 | 9/1981 | Japan . |
| 59-144426 | 8/1984 | Japan . |
| 62-172100 | 7/1987 | Japan . |
| 1085296 | 3/1989 | Japan . |
| 1092295 | 4/1989 | Japan . |
| 2123199 | 5/1990 | Japan . |
| 2248500 | 10/1990 | Japan . |
| 4110400 | 4/1992 | Japan . |
| 5098283 | 4/1993 | Japan . |
| 5098292 | 4/1993 | Japan . |
| 5098294 | 4/1993 | Japan . |
| 5098297 | 4/1993 | Japan . |
| 7802342 | 3/1979 | South Africa . |
| 1174466 | 8/1985 | U.S.S.R. . |
| 1174471 | 8/1985 | U.S.S.R. . |
| 1433961 | 10/1988 | U.S.S.R. . |
| 1555101 | 11/1979 | United Kingdom . |
| 2090860 | 7/1982 | United Kingdom . |
| 2144763 | 3/1985 | United Kingdom . |
| 9306204 | 4/1993 | WIPO . |

OTHER PUBLICATIONS

Alfa–Laval Cuttings Wash System. No Date.
The Alfa–Laval System for Cuttings Wash, ALFA–Laval Oil Field Limited, England, U.K. No Date.
SWACO Geolograph Cuttings Cleaning Package, VS/0171. No Date.
Drilling Mud, Cuttings & Waste Pit Processing for Environmental Benefit & Reduced Costs, Thomas Broadent & Sons Limited, England. No Date.
Van Kampen, *Marine Pollution Bulletin*, 2(9):140–142 (Sep. 1971).
PCT International Search Report for PCT/US94/08729.

*Primary Examiner*—Zeinab El-Arini
*Attorney, Agent, or Firm*—Gregory F. Wirzbicki; Shlomo R. Frieman

[57] ABSTRACT

A method for cleaning oil-contaminated substrates employing a composition composed of a diluent oil, a first surfactant having a HLB value of at least 10, and a second surfactant having a higher HLB value. The difference in the HLB values of the first and second surfactants is at least 3 and a mixture of the surfactants would have a HLB value of at least 11.

78 Claims, 2 Drawing Sheets

METHOD FOR CLEANING AN OIL-COATED SUBSTRATE

CROSS-REFERENCE TO RELATED APPLICATIONS

This application is a continuation-in-part of application Ser. No. 08/172,429, filed Dec. 22, 1993, and now abandoned, which application is incorporated herein in its entirety by reference.

BACKGROUND

The present invention relates to non-aqueous-based cleaning fluids, methods for cleaning oil-coated substrates, methods for cleaning oil-contaminated drill cuttings, methods for cementing a well casing in a borehole, enhanced oil recovery procedures, methods for lifting oil from a wellbore, and methods for recovering oil from tar sands.

Non-aqueous-based cleaning fluids are used to clean unwanted oil from substrates, e.g., to remove grease spots from clothing or other fabrics. However, these cleaning fluids tend to dilute and spread the oil, as opposed fully removing it from the substrate. Furthermore, many of these non-aqueous-based cleaning fluids are toxic. Accordingly, there is a need for a non-aqueous-based cleaning fluid, and especially a non-toxic fluid, that more fully removes unwanted oil from substrates.

In addition, there is a need for an oil-contaminated drill cuttings cleaning method that is commercially viable and sufficiently efficacious for cleaned drill cuttings to pass a sheen test. Current methods which may clean drill cuttings sufficiently to pass the sheen test in a laboratory environment (e.g., methods using solvents like pentane or carbon tetrachloride) are impractical for commercial use because the solvents can be toxic, very volatile, and explosive. Such limitations require the use of prohibitively expensive equipment to safeguard against the potential hazards arising from the use of such solvents.

Regarding conventional commercial techniques for cleaning drill cuttings, these methods generally either employ a base oil wash (wherein oil-contaminated drill cuttings are contacted with a base oil in an attempt to remove most of the oil contaminant from the drill cuttings) or a detergent wash (wherein oil-contaminated drill cuttings are washed with an aqueous surfactant solution). The base oil and detergent wash processes are typically capable of reducing the oil content on the cleaned drill cuttings to only about 5 to about 20 percent, a level not low enough to pass the sheen test.

Another method for cleaning drill cuttings (hereinafter referred to as UNOCLEAN I) was recently disclosed in U.S. Pat. No. 5,156,686, U.S. Pat. No. 5,213,625, U.S. Pat. No. 5,215,596, and U.S. Pat. No. 5,234,577, each of these patents being incorporated herein in their entireties by reference. While the UNOCLEAN I process can clean drill cuttings sufficiently to pass the sheen test, the UNOCLEAN I process has two drawbacks. First, the apparatus employed in the conventional commercial base oil and detergent wash processes must be modified in order to adapt them for use in the UNOCLEAN I process. Second, although the carboxylic acid used in the UNOCLEAN I process is non-toxic, the carboxylic acid must be recycled due to its high cost. The recycling step requires the use of an acid (e.g., HCl) and a base (e.g., NaOH).

There is also a need for a method for cementing casings in wellbores drilled, at least in part, with an oil-based drilling fluid. The current cementing methods tend to leave oil on the wellbore and/or casing surfaces, frequently necessitating the need for expensive, remedial cement squeeze procedures.

Likewise, a demand exists for improved enhanced oil recovery techniques as well as better methods for lifting viscous oils from oil wells.

Furthermore, while commercial technologies exist for extracting oil from water-wet tar sands, there is no commercial technology for removing oil from oil-wet tar sands.

SUMMARY OF THE INVENTION

The invention provides (a) non-aqueous-based cleaning fluids, including non-toxic fluids, that remove the overwhelming bulk of unwanted oil from substrates, (b) commercially viable techniques for cleaning drill cuttings which remove a sufficient amount of oil from the cuttings for the cleaned drill cuttings to pass the sheen test, (c) well cementing procedures which reduce the need for remedial cement squeezes, (d) an enhanced oil recovery procedure for increasing the recovery of crude oil from subterranean formations, (e) a method for lifting heavy, viscous oils from wellbores, (f) a method for recovering oil from tar sands, and (g) numerous other techniques for removing oil from substrates.

The cleaning fluids of the present invention comprise a diluent oil and at least one hydrophilic surfactant and can be classified into five major categories. In one version, the cleaning fluid comprises (a) a polar diluent oil having a dipole moment of at least about 0.5 debye (D); and (b) a surfactant selected from the group consisting of polyoxyethylene sorbitan fatty acid esters, isethionates, polyoxyethylene glycol esters, phosphate esters, ethoxylated amides, N-cocoaminobutyric acid, polyethylene glycol esters, tertiary amine oxides, ethoxylated alkyl phenols, alkanolamides, glycerol esters, monoglycerides, monoglyceride derivatives, sulfates of ethoxylated alcohols, sulfates of ethoxylated alkyl phenols, sulfonates of ethoxylated alkyl phenols, sulfonates of alkylaryls, dimethyl alkyl tertiary amines, tridecyl benzene sulfonic acids, dodecyl benzene sulfonic acids, ethoxylated amines, sulfo derivatives of succinates, quaternary surfactants, tertiary amine oxides, and mixtures thereof.

In another version of the invention, the non-aqueous-based cleaning fluid comprises (a) a non-toxic diluent oil and (b) a surfactant.

The non-aqueous-based cleaning fluid of a further version of the invention is a solution comprising (a) a diluent oil; and (b) a surfactant selected from the group consisting of dimethyl alkyl tertiary amines, tridecyl benzene sulfonic acids, dodecyl benzene sulfonic acids, ethoxylated amines, sulfo derivatives of succinates, quaternary surfactants, tertiary amine oxides, and mixtures thereof.

In a fourth embodiment of the invention, the non-aqueous based cleaning fluid comprises (a) a lipophilic surfactant, (b) a hydrophilic surfactant, and (c) a diluent oil.

The non-aqueous based cleaning fluid of the fifth version of the invention comprises (a) a hydrophilic surfactant having an HLB value of at least about 8 and (b) a diluent oil. In this latter and most preferred version, the diluent oil preferably comprises a polar diluent oil or a combination of polar and nonpolar diluent oils.

The foregoing cleaning fluids readily remove oil from oil-covered substrates (e.g., oil-contaminated drill cuttings, oil-contaminated animals, tar sands, grease-coated cooking and eating utensils, and oil-soiled materials such as pavement, fabrics, etc). A general cleaning methodology involves contacting at least a portion of the oil-covered part of the substrate with one of the above-described cleaning fluids. The cleaning fluid dissolves in the oil and, because the surfactant is dissolved in cleaning fluid, the surfactant is distributed throughout the oil. Without being bound by any theory of operation, it is believed that the surfactants employed in the present invention have a sufficient affinity for water so that, when the cleaning fluid-coated, oil-covered article is rinsed with an aqueous fluid, the surfactant emulsifies the contaminant or coating oil and the diluent oil, creating a water external emulsion. The water external emulsion is readily driven off the substrate by the aqueous fluid rinse, and, frequently, the surface of the substrate is changed from being oil-wet to being water-wet.

Hence, the mode of action of the cleaning fluids of the present invention is quite different from prior cleaning fluids such as (a) aqueous surfactant solutions which act by successively stripping off the outer layer of oil and (b) hydrocarbon solvents which dilute the oil and distribute the diluted oil over a wider area without any mechanism for removing the bulk of the oil from the substrate. In addition, cleaning compositions of the present invention dissolve oil more readily than hydrocarbon solvents (e.g., kerosene).

The cleaning fluids of the invention can also be incorporated into an oil-based drilling fluid. The drilling fluid of this embodiment of the invention comprises (a) a base oil and (b) a surfactant (e.g., an emulsifier and an oil-wetting agent), and (c) at least one drilling fluid additive (e.g., a viscosifier, a weighting agent, and a fluid loss control agent), wherein at least a portion of the surfactant is a hydrophilic surfactant having an HLB value of at least about 8.

Furthermore, the cleaning fluids can be employed in two methods for cementing a well casing in a borehole. In one version, the cleaning fluid is employed as a separate slug and in the other version the cleaning fluid is part of a drilling fluid (such as the one described in the preceding paragraph). The former cementing embodiment comprises the sequential steps of (a) drilling a borehole with a drilling mud into at least a portion of a subterranean formation; (b) placing a well casing in the borehole; (c) displacing the drilling mud from the borehole using a slug of a cleaning fluid of the present invention; (d) passing a slug of an aqueous fluid through the borehole after step (c); and (e) introducing cement into the borehole.

When the cleaning fluid is part of a drilling fluid, the cementing method comprises the sequential steps of (a) drilling a borehole into a subterranean formation with the cleaning fluid-containing drilling fluid; (b) placing a well casing in the borehole; (c) displacing the drilling mud from the borehole using a slug of an aqueous fluid; and (d) introducing cement into the borehole.

The cleaning fluid can also be employed in oil lifting and an enhanced oil recovery processes. The oil lifting process comprises the steps of (a) contacting crude petroleum in a wellbore with a composition comprising (i) a surfactant and (ii) a diluent oil to form an intermediate composition, and (b) contacting the intermediate composition with water. The enhanced oil-recovery process comprises the sequential steps of (a) injecting a slug of one of the above-described non-aqueous-based cleaning fluids into at least a portion of an oil-bearing subterranean formation; and (b) injecting a slug of an aqueous fluid into at least a portion of the formation contacted by the non-aqueous-based cleaning fluid employed in step (a).

BRIEF DESCRIPTION OF THE DRAWINGS

The drill cuttings cleaning, well casing cementing, and oil lifting methodologies as well as other features, aspects, and advantages of the present invention will be better understood with reference to the following description, appended claims, and figures wherein:

DETAILED DESCRIPTION OF THE INVENTION

Figure 1:
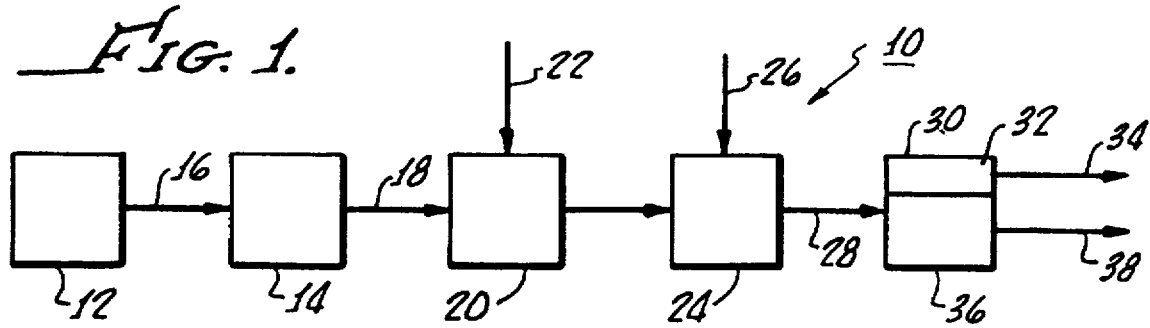
FIG. 1 is a schematic diagram of a drill cuttings cleaning process embodying features of the present invention.

In the cleaning fluids or compositions of the present invention, one or more hydrophilic surfactants are combined with one or more diluent oils in a manner such that, when the cleaning fluid is applied to oil on a substrate, the hydrophilic surfactants in the cleaning composition are substantially uniformly distributed throughout the oil by the diluent oil. Accordingly, the preferred cleaning compositions of the present invention are believed to be true solutions, i.e., uniformly dispersed mixtures, at a molecular level, of one or more surfactants in one or more diluent oils. In other words, in the preferred cleaning fluids, one or more surfactants are completely dissolved in one or more diluent oils. These preferred cleaning fluids tend to be transparent.

The surfactants employed in the cleaning compositions of the present invention include, but are not limited to, those listed in the following Table I.

TABLE I

| Surfactants | |
|---|---|
| Class | Exemplary Species |
| Polyoxyethylene sorbitan fatty acid esters | Polyoxyethylene (20) sorbitan sonolaurate, polyoxyethylene (20) sorbitan isonooleate, polyoxyethylene (20) Sorbitan monopalmitate, polyoxyethylene (20) sorbitan trioleate |
| Isethionates | Coconut acid ester of sodium isoethionate |
| Polyoxyethylene glycol eaters | Polyoxyethylene (10) glycol ester |
| Phosphate esters | Free acid of complex organic phosphate ester |
| Ethoxylated amines | Polyoxyethylene (5) cocoamine, polyoxyethylene (5) tallowamine, N,N'-tris(2-hydroxymethyl)-n, tallow-1 diaminopropane, polyoxyethylene (10) oleylamine |
| Ethoxylated amides | Polyoxyethylene (5) oleamide |
| Cocoaminobutyric acids | N-cocoaminobutyric acid |

TABLE I-continued

| Class | Surfactants<br>Exemplary Species |
|---|---|
| Polyethylene glycol esters | Polyethylene glycol oleic acids having 5 moles of ethylene oxide per mole of acid |
| Tertiary amine oxides | Bis(2-hydroxyethyl)cocoamine oxide, bis(2-hydroxyethyl)tallow amine oxide, |
| Ethoxylated alkyl phenols | Alkylphanoxypoly(ethyleneoxy)ethanol |
| Alkanolamides | Fatty acid alkanolamide |
| Glycerol esters | Glycerol monostearate |
| Monoglycerides and derivatives | Monoglycerides, diglycerides |
| Sulfates of ethoxylated alcohols | Ammonium salt of ethoxylated sulfate |
| Sulfates and sulfonates of ethoxylated alkyl phenols | Ammonium salt of sulfated nonylphonoxypoly(ethyleneoxy)ethanol |
| Sulfonates of alkylaryls | Sodium akylaryl sulfonate |
| Dimethyl alkyl tertiary amines | Dimethyl hydrogenated tallow amine distilled, dimethyl soyamine |
| Tridecyl benzene sulfonic acids | |
| Dodecylbenzene sulfonic acids | |
| Sulfo derivatives of succinates | Dioctyl ester of sodium sulfosuccinic acid |
| Quaternary surfactants | Dicoco dimethyl ammonium chloride |

Because it is always desirable to use a non-toxic substance when practicable and since the surfactants, as detailed more below, tend to end up in rinse water, the surfactant is preferably non-toxic. Exemplary non-toxic surfactants include, but are not limited to, polyoxyethylene sorbitan fatty acid esters, polyoxyethylene glycol esters, polyethylene glycol esters, and glycerol esters.

One or more of the above surfactants are dispersed or, preferably, dissolved in a diluent oil to form the cleaning compositions of the present invention. The diluent oil acts as a solvent, cutting oil on the surface of a substrate and distributing the surfactant throughout the oil.

Typical diluent oils include, but are not limited to, polyalphaolefins (e.g., dimer of 1-decene), white mineral oils, paraffinic solvents, esters, ethers, polybutylenes, polyisobutylenes, silicone oils, crude oils, kerosenes, diesel oils, gasolines, naphthas, aryl halides, heterocyclic compounds, alkyl halides, carboxylic acids, amines, alcohols, aldehydes, ketones, plant oils (e.g., linseed oil, canola oil, soybean oil, corn oil, peanut oil, rapeseed oil, sunflower oil, palm oil, and olive oil), animal oils (e.g., animal fats), terpenes, and terpenoids.

The diluent oil is preferably non-toxic since, as noted above, it is always desirable to use a non-toxic substance whenever possible. Common non-toxic diluent oils include, but are not limited to, polyalphaolefins, white mineral oils, paraffinic solvents, organic esters, ethers, polybutylenes, polyisobutylenes, and silicone oils. In addition, because they are less flammable, the diluent oils preferably have an initial boiling point (as determined in accordance with ASTM D 2887) greater than about 204.4° C. (400° F.), more preferably at least about 218.3° C., (425° F.), even more preferably at least about 232.2° C. (450° F.), and most preferably at least about 246.1° C. (475° F). (Since a numerical range includes all integers and mixed numbers within the limits specified by the range, the recitation of a range in the specification and claims herein specifically includes a recitation of each integer and mixed number encompassed by the range.)

Due to their low cost and commercial availability, white mineral oils and diesel oils are the preferred diluent oils.

Since white mineral oils are non-toxic, they are the most preferred diluent oils.

Some of the surfactants (e.g., polyoxyethylene sorbitan fatty acid esters, dimethyl alkyl tertiary amines, dodecylbenzene sulfonic acid, tridecyl benzene sulfonic acid, ethoxylated amines, sulfo derivatives of succinates, quaternary surfactants, and tertiary amine oxides) are soluble in nonpolar diluent oils. (As used in the specification and claims, the term "nonpolar diluent oil" means a diluent oil having a dipole moment of less than 0.5 D.) Exemplary nonpolar diluent oils include, but are not limited to, polyalphaolefins, white mineral oils, paraffinic solvents, polybutylenes, polyisobutylenes, crude oils, kerosenes, diesel oils, gasolines, naphthas, and alkanes having 5 to about 15 carbon atoms (i.e., pentane, hexane, heptane, octane, nonane, decane, undecane, dodecane, tridecane, tetradecane, and pentadecane). The dipole moments of some nonpolar diluent oils are listed below in Table II.

TABLE II

| Nonpolar Diluent Oil Dipole Moments | |
|---|---|
| Nonpolar Diluent Oil | Dipole Moment, D |
| Gasoline | 0.17 |
| Mineral Oil | 0.22–0.41 |

Surfactants insoluble in nonpolar diluent oils are dissolved in polar diluent oils or a mixture of polar and nonpolar diluent oils. (As used in the specification and claims, the term "polar diluent oil" means a diluent oil having a dipole moment of at least 0.5 D.) Preferably, the polar diluent oils have dipole moments of at least about 1, more preferably at least about 1.5, even more preferably at least about 2, and most preferably at least about 2.5, D. Exemplary polar diluent oils include, but are not limited to, the oils set forth below in Table III:

TABLE III

Representative Polar Diluent Oils

| Class | Species |
|---|---|
| Plant Oils | linseed oil, canola oil, soybean oil, corn oil, peanut oil, rapeseed oil, sunflower oil, palm oil, olive oil |
| Animal Oils | Animal fats |
| Terpenes And Terpenoids | citrus oil, lemon oil, orange oil, rosin oil, pine tar pitch, pine oil, terpineol, limonene |
| Aryl Halides | halotoluehe[1], dihalotoluene, dihalobenzene, dihaloalkylbenzene[2] |
| Heterocyclic Compounds | furfural, quinoline |
| Alkyl Halides | octyl halide[1] cyclohexyl halide |
| Ketones | 2,5-hexanedione, 2,6,8-trimethyl isobutylheptylketone, butyrophenone, methyl heptyl ketone, cyclohexanone |
| Carboxylic Acids | valeric acid, caproic acid, heptanoic acid octanoic acid, nonanoic acid, oleic acid, linoleic acid, linolenic acid, 2-methyl propionic acid, 3-methyl butanoic acid |
| Amines | aniline, methyl aniline, dimethyl aniline, toluidine, anisidine, haloaniline[1], tripropylamine, triamyl amine, heptyl amine, dicylcohexyl amine, dibutylazine, tributyl amine, monobutyl dianylazine, octylamine, dioctylamine |
| Esters | 2-ethoxyethyl acetate, ethylene glycol diacetate, 2-butoxyethyl acetate, 2-ethylhexyl acetate, 2-(2-ethoxyethoxy)ethyl acetate, 2-(2-butoxyethoxy)ethyl acetate, glyceryl triacetate, 2,2,4-trimethyl pentanediol, diisobutyrate, glyceryl tributyrate, tributyl phosphate, dimethyl phthalate, diethyl phthalate, dipropyl phthalate, dibutyl phthalate, benzyl acetate, bis(2-ethylhexyl) adipate, undecanoic γ-lactone |
| Alcohols | hexanol, octanol, nonanol, decanol, ethylhexanol, octanol, isoctyl alcohol, cyclohexanol, isodecanol, benzyl alcohol, phenylethanol, 3,5-dimethyl-1-hexanol, 2,2,4-trimethyl-1-pentanol, 2,6-dimethyl-4-heptanol, 3,3,5-trimethylhexanol, diacetone alcohol, furfuryl alcohol, 2-heptyl alcohol |
| Aldehydes | heptaldehyde, octanal, benzaldehyde, tolualdehyde, phenylacetaldehyde, salicylaldshyde, anisaldehyde, tetrahydrobenzaldehyde |
| Ethers | phenetole, hexyl ether, dibenzyl ether, butylphenyl ether, amyl phenyl ether, amyl benzyl ether, amyl tolyl ether, octyl phenyl ether, hexyl phenyl ether |

[1]Exemplary halides are bromine, chloride, and iodine.
[2]The alkyl group generally contains 1 to about 6 carbon atoms, with about 2 carbon atoms being preferred.

Because they are non-toxic, commercially available, and inexpensive, the polar diluent oil is preferably selected from the group consisting of plant oils, animal oils, terpenes, terpenoids, and mixtures thereof. The following Table IV sets forth dipole moments of some non-toxic, polar diluent oils.

TABLE IV

Polar Diluent Oil Dipole Moments

| Nonpolar Diluent Oil | Dipole Moment, D |
|---|---|
| Terpenes and Terpenoids | |
| d-limonene | 1.56 |
| d-pinene | 2.67 |
| Sesquiterpene | 0.97–1.12 |
| Cerin | 1.39 |
| Vegetable Oils | |
| Castor | 3.7 |
| Coconut | 2.2 |
| Linseed | 3.0 |
| Olive | 3.03 |
| Peanut | 2.3 |
| Poppy | 3.06 |
| Rapeseed | 2.7 |
| Sesame | 2.91 |
| Tung | 2.29 |

Due to its commercial availability and pleasant smell, the preferred polar diluent oil is d-limonene.

In a further embodiment of the present invention, the cleaning fluid comprises (a) a lipophilic surfactant, (b) a hydrophilic surfactant, and (c) a diluent oil (which can be a polar diluent oil, a nonpolar diluent oil, or a mixture of polar and nonpolar diluent oils). (As used in the specification and claims, the term "lipophilic surfactant" means a surfactant having an HLB value of less than 8, and the term "hydrophilic surfactant" means a surfactant having an HLB value of at least 8.) Exemplary lipophilic surfactants include, but are not limited to, sorbitan fatty acid esters (e.g., sorbitan monolaurate, sorbitan monooleate, sorbitan monopalmitate, and sorbitan trioleate) and glycol esters. Some specific lipophilic surfactants are listed (together with their respective HLB values) in the following Table V.

TABLE V

| Lipophilic Surfactant | | |
|---|---|---|
| Trade Name | Generic Name | HLB Value |
| Emsorb 2507 | Sorbitan tristearate | 2.7 |
| Emsorb 2515 | Sorbitan monolaurate | 7.4 |
| Emerest 2381 | Propylene glycol monostearate | 4 |
| Emsorb 2500 | Sorbitan monooleate | 4.8 |
| Span 85 | Sorbitan trioleate | 1.8 |
| | Glycerol monostearate | 3.8 |
| Atmul 651k | Kosher mono & diglycerides | 3.5 |
| Alkanol DW | Sodium alkylaryl sulfonate | 6.7 |

Typical hydrophilic surfactants include, but are not limited to, polyoxyethylene sorbitan fatty acid esters (e.g., polyoxyethylene (20) sorbitan monolaurate, polyoxyethylene (20) sorbitan monooleate, polyoxyethylene (20) sorbitan monopalmitate, and polyoxyethylene (20) sorbitan trioleate) and polyoxyethylene glycol esters (e.g., polyoxyethylene (10) glycol ester). Some exemplary hydrophilic surfactant species are listed with their respective HLB values in the following Table VI.

TABLE VII

| Hydrophilic Surfactant | | |
|---|---|---|
| Trade Name | Generic Name | HLB Value |
| Emsorb 6907 | POE$^a$ (20) sorbitan tristearate | 11 |
| Emsorb 6915 | POE (20) sorbitan monolaurate | 16.5 |
| Emsorb 6900 | POE (20) sorbitan monooleate | 15 |
| Ethofat O-15 | Polyethylene glycol oleic acids 5 moles EO$^b$ per mole acid | 8.6 |
| Emersal 6430 | Ammonium lauryl sulfate | 31 |
| Tween 40 | POE (20) sorbitan monopalmitate | 15.6 |
| Tween 21 | POE (4) sorbitan monolaurate | 13.3 |
| Tween 85 | POE (20)-sorbitan trioleate | 11 |

$^a$POE denotes "polyethylene oxide".
$^b$EO denotes "ethylene oxide".

Because hydrophilic surfactant-containing cleaning compositions tend to exhibit the greatest cleaning action, all other parameters being equal, in the most preferred cleaning compositions of the present invention, at least one hydrophilic surfactant is employed. The hydrophilic surfactants preferably have as high a HLB value as possible while maintaining the cleaning composition in a solution state. For nonpolar diluent-containing cleaning compositions, hydrophilic surfactants insoluble in the nonpolar diluent oil are generally solubilized therein by incorporating into the cleaning composition (a) one or more other surfactants soluble in the nonpolar diluent oil, (b) a polar diluent oil, and/or (c) one or more other surfactants soluble in a combination of the nonpolar and polar diluent oils. Since the efficacy of the cleaning composition improves as the HLB value of the hydrophilic surfactant increases (all other factors being held constant), it is preferred that the HLB value of the surfactants employed in above items (a) and (c) be as high as possible and that the difference between the HLB value of the hydrophilic surfactant and the surfactants of items (a) and (c) be as large as feasible. Accordingly, the difference between the HLB values of the hydrophilic surfactant and the surfactants of items (a) and (b) is generally at least about 0.5, preferably at least about 1, more preferably at least about 1.5, even more preferably at least about 2, and even more preferably at least about 2.5. In fact, it is very desirable for this difference in HLB values to be at least about 3, 3.5, 4, 4.5, and even about 5 or more.

The surfactant concentration employed in the cleaning composition of the present invention depends on the intended use of the composition. With this caveat in mind, the surfactant concentration in the cleaning fluid composition typically ranges from about 0.5 to about 50 volume percent (the volume percent being based on the total volume of surfactant(s), polar diluent oil(s), and nonpolar diluent oil(s) in the composition). Often, at least about 1, more often at least about 5, even more often at least about 8, and most often at least about 10, volume percent surfactant is present in the cleaning composition. Frequently, the composition comprises less than about 45, more frequently less than about 40, even more frequently less than about 35, and most frequently less than about 30, volume percent surfactant. Cleaning compositions containing a plurality of hydrophilic surfactants typically have a total hydrophilic surfactant concentration of about 5 to about 20, and more typically about 7 to about 15, volume percent.

When a cleaning composition is formed by first combining a surfactant and a polar diluent oil to form an intermediate composition and then combining the intermediate composition with a nonpolar diluent oil to form the cleaning composition, the intermediate composition generally comprises less than about 90, preferably less than about 80, more preferably less than about 70, even more preferably less than about 60, and most preferably less than about 50, volume percent polar diluent oil (the volume percent being based on the total volume of the surfactant and polar diluent oil in the intermediate composition). Typically, the intermediate composition comprises at least about 5, more typically at least about 10, even more typically at least about 20, and most typically at least about 30, volume percent polar diluent oil. The ratio of the weight of the polar diluent oil to the weight of the surfactant present in the intermediate composition is commonly about 0.1:1 to about 10:1, preferably about 0.2:1 to about 8:1, more preferably about 0.3:1 to about 6:1, even more preferably about 0.4:1 to about 4:1, and most preferably about 0.5:1 to about 2:1.

In the embodiment of the invention employing a combination of lipophilic and hydrophilic surfactants, the ratio of the volume of hydrophilic surfactant to the volume of lipophilic surfactant used in formulating the non-aqueous-based cleaning fluid is generally about 10:1 to about 0.1:1, preferably about 7:1 to about 0.3:1, more preferably about 5:1 to about 0.5:1, even more preferably about 3:1 to about 0.7:1, and most preferably about 2:1 to about 1:1.

In general, as long as the cleaning composition remains homogenous (i.e., in a solution state), the efficacy of the composition increases with (a) increasing hydrophilic surfactant concentration and (b) increasing HLB value of the hydrophilic surfactant employed. Accordingly, the hydrophilic surfactant generally constitutes about 10 to about 100 percent of the total weight of all the surfactants present in the cleaning composition. Preferably, the hydrophilic surfactant comprises at least about 25, more preferably at least about 50, even more preferably at least about 75, and most preferably at least about 90, percent of the total weight of all the surfactants present in the cleaning composition.

With respect to the HLB value of the hydrophilic surfactant, the HLB value is typically at least about 9, preferably at least about 10, more preferably at least about 12, even more preferably at least about 13, and most preferably at least about 14.

Because many of the surfactants employed in forming the compositions of the present invention are believed to have an affinity for water, the intermediate and cleaning compositions preferably contain little, if any, water in order to prevent the surfactant from becoming tied up with water in the compositions. Accordingly, the compositions commonly contain less than about 20, more commonly less than about 10, even more commonly less than about 5, and most commonly less than about 1, volume percent water (the volume percent being based on the total amount of surfactant, diluent oil, and water present in the composition). In fact, the compositions preferably contain less than 0.5, more preferably less than about 0.1, even more preferably less than about 0.05, and most preferably less than about 0.01, volume percent water.

The cleaning compositions of the present invention optionally comprise solids (e.g., diatomaceous earth, bentonite, sand) to act, for example, as scrubbing agents and/or weighting agents. The solids are typically present in a concentration up to about 20 weight percent (the weight percent being based on the total weight of all ingredients present in the composition). When used, the solids are preferably present in a concentration of at least about 0.1, more preferably at least about 0.5, even more preferably at least about 1, and most preferably about 5 to about 15, weight percent.

While liquids and solids other than surfactants and diluent oils are optionally existent in the cleaning compositions of the present invention, the compositions generally contain less than about 10, preferably less than about 5, more preferably less than about 1, even more preferably less than about 0.5, and most preferably less than about 0.01, volume percent liquids other than surfactants and diluent oils (the volume percent being based upon the total volume of the composition). In addition, the compositions typically contain less than about 10, preferably less than about 5, more preferably less than about 1, even more preferably less than about 0.5, and most preferably less than about 0.01, weight percent solids other than any solid surfactants and diluent oils (the weight percent being based upon the total weight of the composition).

The cleaning compositions of the present invention are employed, inter alia, to clean oil-covered, -coated, or -contaminated surfaces. In order to reduce the amount of cleaning composition required, these surfaces should preferably be as devoid of water as practicable. For example, when possible, it is very desirable to shake, wipe, or otherwise remove surface water.

In addition, the viscosity of the cleaning composition can also be adjusted to ensure that the cleaning composition remains in contact with the surface being cleaned. In particular, a cleaning composition intended for use on a thin (e.g., barbecue grill) or substantially vertical (e.g., wall) surface preferably has a high viscosity so that the cleaning composition tends to remain on the surface where applied, whereas a cleaning composition employed to clean horizontal, broad surfaces (kitchen counter or stove top) or porous particles (e.g., tar sands) preferably has a low viscosity.

One technique for varying the viscosity of cleaning fluid entails selecting an appropriate diluent oil. In general, the lower the viscosity of the diluent oil, the greater the solvency action of the cleaning fluid (all other factors being equal). Also, the higher the viscosity of the diluent oil the more the cleaning composition tends to cling to a surface (all other parameter being held constant). When a low viscosity cleaning composition is desired, a diluent oil (e.g., a mineral oil) having a viscosity typically up to about $0.01 \text{N-sec/m}^2$ (10 centipoise), and more commonly about 0.004 to about $0.005 \text{N-sec/m}^2$ (4 to 5 centipoise), is used to formulate the cleaning composition. However, when a high viscosity cleaning composition is needed, a diluent oil having a viscosity generally greater than about $0.05 \text{N-sec/m}^2$ (50 centipoise), and more usually about 0.05 to about $0.1 \text{N-sec/m}^2$ (50 to 100 centipoise), is employed in preparing the cleaning composition.

In general, an oil-covered article (e.g., oil-covered animals, automotive parts, road surfaces, patios, driveways, rocks, paint brushes, and fabrics (such as clothing, carpeting, linens), as well as smoke-covered articles (such as fireperson's clothing, helmets, tools) and greasy cooking and eating utensils (such as pots, pans, ovens, stoves, grills, dishes)) is contacted with the cleaning composition. Typically, the volumetric ratio of the volume of cleaning composition employed per unit volume of oil adhering to a substrate to be cleaned is at least about 2:1, more typically at least about 5:1, and most typically at least about 10:1. However, another interesting aspect of the present invention is that only a small amount of cleaning composition is actually required to remove an oil adhering to a substrate. In particular, commonly less than 2 (and more commonly about 1.5 or less) unit volumes of cleaning composition are sufficient to remove one unit volume of oil from a substrate.

The cleaning fluid-coated, oil-covered article is preferably stirred or otherwise mixed or manipulated to ensure that all the oil-covered surfaces are contacted with the cleaning composition. As a result of the cleaning composition contacting the oil, the cleaning composition dissolves in the oil, and, because the surfactant is dissolved in or otherwise substantially uniformly dispersed throughout the cleaning composition, the surfactant becomes distributed throughout the oil.

The length of time that the cleaning composition is allowed to remain in contact with the oil-covered article depends on a number of factors, including the specific cleaning composition used, the object to be cleaned, and the type of oil to be removed. Typically, the contact time runs from a fraction of a second to several hours. In general, the contact time is about 1 second to about 24 hours, more commonly about 5 seconds to about 1 hour, even more commonly about 10 seconds to about 30 minutes, and most commonly about 15 seconds to about 1 minute.

After the end of the desired contact time, the cleaning composition-coated article is rinsed with an aqueous fluid (e.g., water). In order to emulsify and dislodge any oil present in the pores of an oil-coated substrate, the velocity of the water applied to the cleaning composition-coated article is preferably increased with increasing substrate porosity (i.e., increasing surface area per unit weight of the substrate). Accordingly, a porous substrate (e.g., cement) is preferably rinsed using a strong spray or jet of the aqueous fluid.

As noted above, when the cleaning fluid-coated, oil-covered article is rinsed with an aqueous fluid, the surfactant emulsifies the contaminant and diluent oils, creating a water external emulsion. The water external emulsion is readily driven off the substrate by the aqueous fluid rinse and, frequently, the surface of the substrate is changed from being oil-wet to water-wet. (Hence, the manner in which the cleaning compositions of the present invention remove oil from a substrate drastically differs from prior cleaners such as (a) aqueous surfactant solutions which successively remove only a thin, external portion of a layer of oil and (b) hydrocarbon solvents which merely dissolve the oil and spread it over a wider area.)

Generally an excess of aqueous fluid is used to rinse the cleaning fluid-coated, oil-covered article. However, when it is desirable to keep the amount of aqueous fluid employed in the rinsing process down and when the substrate has a low surface area per unit volume (e.g., stainless steel, linoleum), the cleaning fluid-coated oil-covered article can be simply rinsed with a damp cloth.

In a more specific cleaning embodiment, the cleaning fluid is employed to clean drill cuttings. As shown in FIG. 1, in a drill cutting cleaning system 10 embodying features of the present invention, oil-contaminated drill cuttings are transported from a shaker screen 12 to a receiving hopper 14 by a chute or other conduit 16. The drill cuttings are removed at a constant rate from the receiving hopper 14 by a conveyor belt 18 and transported to a rotating drum 20. In the rotating drum 20, the drill cuttings are combined with a cleaning composition introduced through a conduit 22. Preferably, the rotation of the drum 20 causes the drill cuttings and cleaning composition to be constantly mixed or stirred during their transit through the drum 20. The residence time of the drill cuttings in the rotating drum 20 is typically about 0.25 to about 15, more typically about 0.5 to about 10, even more typically about 1 about 5, and most typically about 2 to about 3, minutes.

Upon leaving the rotating drum 20, the cleaning composition-coated drill cuttings drop onto a washer shaker screen 24. As the drill cuttings are being transported over the washer shaker screen 24, they are rinsed with water sprayed from a conduit 26. The water removes the bulk of the contaminant oil, diluent oil, and surfactant from the drill cuttings, with these fluids being transported through a conduit 28 to a gravity or centrifugal separator 30. The cleaned drill cuttings are capable of passing the sheen test and can be disposed of using an environmentally acceptable procedure, e.g., by discharge into the ocean (not shown).

The contaminant and diluent oils removed from the drill cuttings rise towards the top of the separator 30 and form an oil phase 32. The oil phase 32 subsequently exits the separator 30 through a conduit 34 and is generally either returned to the drilling mud pit (not shown) or taken to a facility (not shown) for proper disposal or upgrading.

As the contaminant and diluent oils rise towards the top of the separator 30, the surfactant and rinse water form an aqueous phase 36 below the oil phase 32. The aqueous phase 36 leaves the separator 30 through a conduit 38. When non-toxic surfactants are employed in the cleaning composition, the aqueous effluent is environmentally safe and dischargeable into the environment without any need for remedial treatment.

Figure 2:
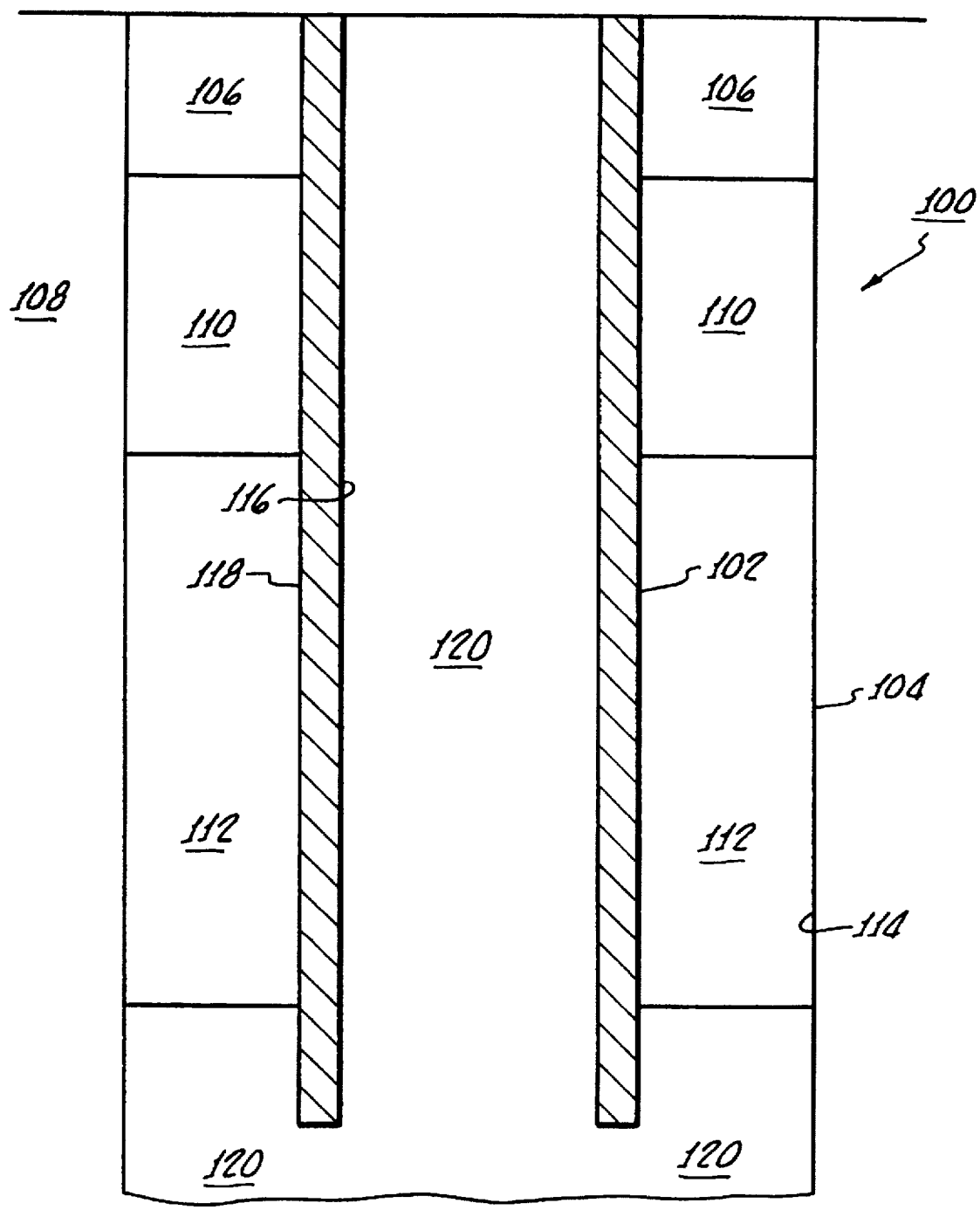
FIG. 2 is a schematic cross-sectional view of a wellbore being subjected to the well casing cementing process of the present invention.

The cleaning fluid of the present invention can also be employed in a method for cementing casings in wellbores drilled with an oil-based drilling fluid. With reference to FIG. 2, this figure schematically shows a cross-section of a well 100 wherein a well casing 102 is being cemented in a borehole 104 using a well cementing technique embodying features of the present invention. More specifically, in one version of the well casing cementing method of the present invention, after drilling the borehole 104 with an oil-based drilling mud 106 into a subterranean formation 108 and placing the well casing 102 in the borehole 104, the drilling mud 106 is displaced from the borehole 104 using a slug 110 of the cleaning composition of the present invention. Next, a slug 112 of an aqueous fluid, e.g., water, is passed through the borehole 104 to remove the cleaning composition slug 110 and any residual drilling mud 106 from the surface 114 of the borehole 104 and the inside surface 116 and the outside surface 118 of the well casing 102. Finally, a sufficient amount of a slug 120 of cement is introduced into the borehole 104 to cement the well casing 102 in the borehole 104.

The sizes of the cleaning composition slug 110 and rinse water slug 112 employed in the well cementing process of the present invention are dependent upon, inter alia, the annulus volume between the outside surface 118 of the well casing 102 and the borehole surface or wall 114, the interior volume defined by the inside surface 116 of the well casing, the volume of drilling mud in the borehole 104, the type of drilling mud being displaced, and the type of cement being used. Usually, the volume of the cleaning composition slug 110 runs from about 0.02 to about 1, more commonly about 0.04 to about 0.75, even more commonly about 0.05 to about 0.5, and most commonly about 0.075 to about 0.3, times the sum of the annulus and interior volumes. Typically, the size of aqueous fluid rinse slug 112 employed is at least about 0.5, more typically at least about 1, even more typically at least about 2, and most typically at least about 3, times the volume of the cleaning composition slug 110.

A significant aspect of the present version of the well cementing technique of the present invention is that, while a spacer fluid is optionally employed between the aqueous fluid rinse slug 112 and the cement slug 120 in the well casing cementing process of the present invention, no spacer is needed. Therefore, a spacer is preferably not employed in the cementing process of the present invention.

The cleaning fluid of the present invention can also be used in enhance oil recovery and oil lift operations. In an enhanced oil recovery technique embodying features of the present invention, one or more slugs of a cleaning composition within the scope of the present invention is injected into at least a portion of an oil-bearing subterranean formation. Next, an aqueous drive fluid (e.g., water, steam) is injected into at least a portion of the subterranean formation contacted by the cleaning fluid. A sufficient amount of the aqueous drive fluid is preferably employed so that at least a portion of the injected aqueous fluid is produced from one or more producing wells. Alternatively, after the initial injection of the aqueous drive fluid, another drive fluid (e.g., carbon dioxide or other inert gas) is optionally injected in place of the aqueous drive fluid.

Figure 3:
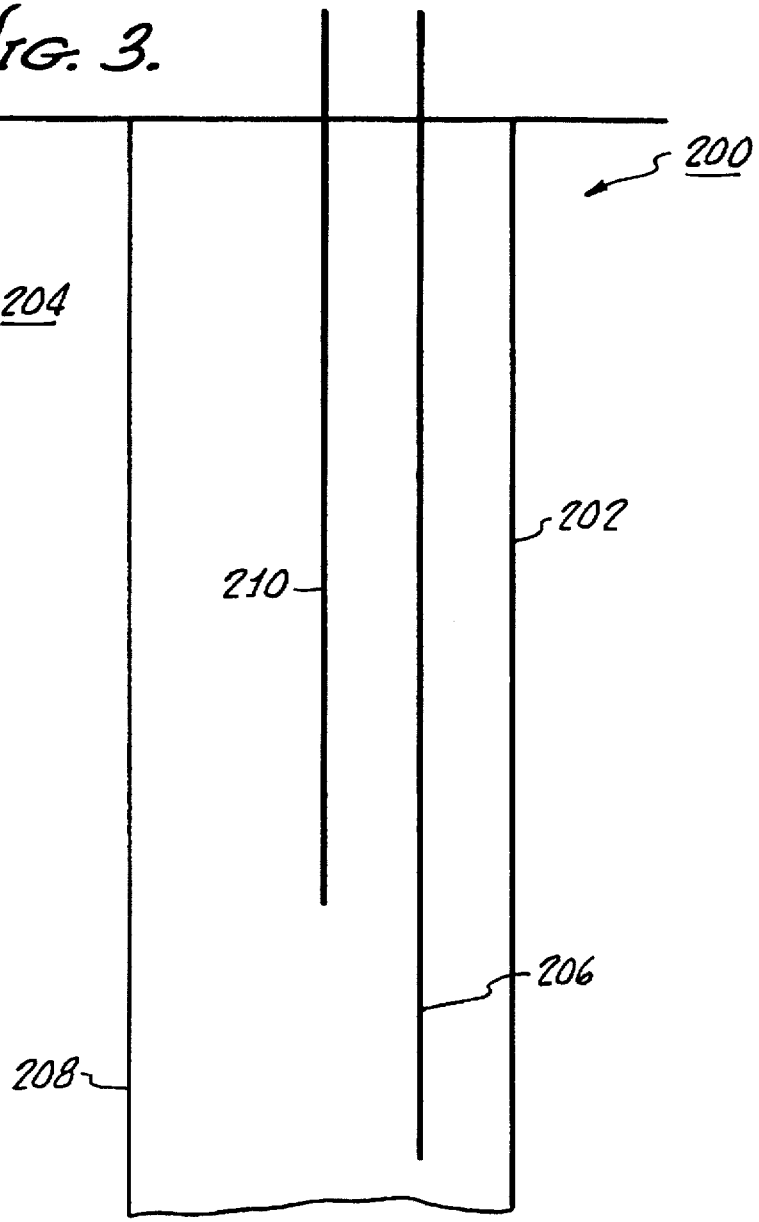
FIG. 3 is a schematic cross-sectional view of a wellbore adapted for use in an oil lifting process embodying features of the present invention.

In the oil lift process of the present invention, the cleaning fluid is employed to aid in lifting heavy oils from a wellbore. As shown in FIG. 3, an oil production system 200 comprises a wellbore 202 penetrating into a subterranean formation 204. The wellbore 202 is fitted with a tubing 206 for transporting the cleaning composition to a heavy oil (not shown) located proximate the bottom 208 of the wellbore 202. The cleaning composition commingles with the heavy oil as the oil rises in the wellbore 202. In addition, an aqueous fluid (e.g., water) is transported down the wellbore 202 through another tubing 210. The water exiting the second tubing 210 mixes with the heavy oil/cleaning composition mixture and forms a fluid having a viscosity less than that of the heavy oil. The resulting fluid, which is more readily produced from the wellbore 202, is transported to a separating tank (not shown) where the oil is separated from the water. The separated oil is sent to a refinery (not shown) and the separated water is either reused in the foregoing process or disposed of in an environmentally acceptable manner.

The cleaning compositions of the present invention are also employed in an oil-based drilling fluid. The oil-based drilling fluid embodying features of the present invention comprises (a) a base oil, (b) a surfactant (e.g., emulsifiers and oil-wetting agents), and (c) at least one ingredient selected from the group consisting of fluid loss control agents, viscosifiers, weighting agents, water, shale stabilizing salts, and lime. The drilling fluid is distinguished in that at least a portion of the surfactant is a hydrophilic surfactant. As described in more detail below, the presence of the hydrophilic surfactant in the drilling fluid enables the implementation of drill cuttings cleaning and cementing processes even less complicated than the respective streamlined methods discussed above.

As noted in the preceding paragraph, the drilling fluid of the invention is characterized in that the surfactant comprises a hydrophilic surfactant. In general, as the concentration of the hydrophilic surfactant in the drilling fluid increases, the amount of residual oil present on the drill cuttings decreases after being subjected to the simplified drill cuttings cleaning procedure described below. Accordingly, the drilling fluid typically comprises about 0.5 to about 15, preferably about 1 to about 10, more preferably about 2 to about 9, even more preferably about 3 to about 8, and most preferably about 4 to about 7, weight percent hydrophilic surfactant (i.e., the weight of the hydrophilic surfactant divided by the weight of all ingredients employed to formulate the drilling fluid, the quotient being multiplied by 100 percent).

In relationship to any other surfactants employed in the drilling fluid, the hydrophilic surfactant typically comprises at least about 10, preferably at least about 25, more preferably at least about 50, even more preferably at least about 60, and most preferably at least about 70, weight percent of the total surfactant content of the drilling fluid (i.e., the weight of the hydrophilic surfactant divided by the weight of all surfactants employed to formulate the drilling fluid, the quotient being multiplied by 100 percent). In fact, the hydrophilic surfactant can comprise at least about 75, 80, 85, 90, 95 or more weight percent of the total surfactant content of the drilling fluid. Accordingly, the hydrophilic surfactant can comprise even 100 weight percent of the total surfactant content of the drilling fluid.

In addition, as the HLB value of the hydrophilic surfactant in the drilling fluid increases, the amount of residual oil present on the drill cuttings also decreases after being subjected to the simplified drill cuttings cleaning procedure described below, provided that the hydrophilic surfactant is well dispersed throughout, and preferably dissolved in, the base oil component of the drilling fluid. Hence, the hydrophilic surfactant preferably has a HLB value greater than 8, such as at least about 9, 10, 11, 12, 13, 14, and 15 or more.

Various techniques are employed to ensure that the hydrophilic surfactant is uniformly distributed or dissolved in the base oil used in the drilling fluid. One method entails employing a plurality of surfactants. Since like substances tend to dissolve like substances, the presence in the drilling fluid of one surfactant (e.g., a lipophilic or hydrophilic surfactant) that is soluble in the base oil facilitates the dissolution of another surfactant having a higher HLB value and which otherwise would not be soluble in the base oil. Preferably, at least two hydrophilic surfactants are present in the drilling fluid.

Another technique for ensuring that the hydrophilic surfactant is uniformly distributed or dissolved in the drilling fluid entails the use of one or more of the polar diluent oils described above. Since the use of a polar diluent oil adds to the cost of the resulting drilling fluid, it is preferred to use as little polar diluent oil as possible. When employed, the ratio of the weight of polar diluent oil to the weight of hydrophilic surfactant present in the drilling fluid is commonly about 0.1:1 to about 5:1, preferably about 0.2:1 to about 4:1, more preferably about 0.3:1 to about 3:1, even more preferably about 0.4:1 to about 2:1, and most preferably about 0.5:1 to about 1.5:1. Quite often, the ratio of the weight of polar diluent oil to the weight of hydrophilic surfactant present in the drilling fluid is about 1:1.

To enable the aqueous effluent produced from the drill cuttings cleaning processes described below to be dischargeable into the environment without any need for remedial treatment, the hydrophilic surfactant is preferably non-toxic. The polyoxyethylene sorbitan fatty acid esters and polyethylene glycol esters listed above in Table VI are exemplary non-toxic, hydrophilic surfactants.

Any base oil used in oil-based drilling fluid, e.g., diesel oil, mineral oils, crude oil, and polyalphaolefins, are suitable for use in the present invention. In addition, the white mineral oil described in copending U.S. patent application Ser. No. 08/065,644, filed May 21, 1993 and now U.S. Pat. No. 5,333,698 (and which is incorporated herein in its entirety by reference) can be used as the base oil. One advantage arising from the use of polyalphaolefins, white mineral oils, or other non-toxic oils as the base oil (especially in combination with non-toxic surfactants) is that the drilling operator has the option of either discarding or washing oil-covered drill cuttings produced during the drilling operation. Another advantage of using such non-toxic oils is that some, if not all, of any oil left on washed drill cuttings will be non-toxic.

One or more emulsifiers, wetting agents, viscosifiers, weighting agents, fluid loss control agents, and shale inhibiting salts are also optionally used in the oil-based drilling fluid of the present invention. Exemplary species of these optional materials are listed in the following Table VII.

TABLE VII

| Optional, Oil-Based Drilling Fluid Additives | |
| --- | --- |
| Genus | Species |
| Emulsifiers | Fatty acids, soaps of fatty acids, and fatty acid derivatives including amido-amines, polyamides, polyamines, esters (such as sorbitan monoleate polyethoxylate, sorbitan dioleate polyethoxylate), imidaxolines, and alcohols |
| Wetting agents | Lecithin, fatty acids, crude tall oil, oxidized crude tall oil, organic phosphath esters, modified imidazolines, modified amidoamines, alkyl aromatic sulfates, alkyl aromatic sulfonates, and organic esters of polyhydric alcohols |
| Viscosifiers | organophilic clays (e.g., hectorite, bentonite, and attapulgite), oil soluble polymers, polyamide resins, polycarboxylic acids and soaps, and sulfonated elastomers Barite, iron oxide, gelana, siderite, and calcium carbonate |
| Non-fluid loss control agents | Asphaltics (e.g., asphaltenes and sulfonated asphaltenes), amine treated lignite, and gilsonite |
| Shale inhibiting salts | Alkali metal and alkaline-earth metal salts (calcium chloride and sodium chloride being preferred) |
| Polymeric fluid loss control agents | Polystyrene, polybutadiene, polyethylene, polypropylene, polybutylene, polyisoprene, natural rubber, butyl rubber, polymers consisting of at least two monomers selected from the group consisting of styrene, butadiene, isoprene, and vinyl carboxylic acid |

For drilling fluids intended for use in high temperature environments (e.g., where the bottom hole temperature exceeds about 204.4° C. (400° F.)), it is desirable to employ a sulfonated elastomer polymeric viscosifier and a polymeric fluid loss control agent in order to obtain improved rheological properties at this elevated temperature. Preferably, the sulfonated elastomer polymeric viscosifier is a neutralized sulfonated elastomer polymer having about 5 to about 100 milliequivalents of sulfonate groups per 100 g of sulfonated polymer. More preferably, the neutralized sulfonated elastomer polymer has about 5 to about 50 milliequivalents, and most preferably about 5 to about 30 milliequivalents, of sulfonate groups per 100 g of sulfonated polymer.

Preferably, the sulfonated elastomer polymeric viscosifier is derived from an elastomer polymer selected from the group consisting of ethylene-propylene-diene monomer (EPDM) terpolymers, copolymers of isoprene and styrene sulfonate salt, copolymers of chloroprene and styrene sulfonate salt, copolymers of isoprene and butadiene, copolymers of styrene and styrene sulfonate salt, copolymers of butadiene and styrene sulfonate salt, copolymers of butadiene and styrene, terpolymers of isoprene, styrene, and styrene sulfonate salt, terpolymers of butadiene, styrene, and styrene sulfonate salt, butyl rubber, partially hydrogenated polyisoprenes, partially hydrogenated polybutylene, partially hydrogenated natural rubber, partially hydrogenated buna rubber, partially hydrogenated polybutadienes, and Neoprene. Methods for obtaining and characteristics of sulfonated elastomer polymers are known to those skilled in the art. See, for example, U.S. Pat. No. 4,447,338, U.S. Pat. No. 4,425,462, U.S. Pat. No. 4,153,588, U.S. Pat. No. 4,007,149, U.S. Pat. No. 3,912,683, and UK Patent Application 2,212,192, these documents being incorporated in their entirety by reference.

The preferred polymeric fluid loss control agents are styrene-butadiene copolymers. Characteristics of exemplary styrene-butadiene copolymers are listed in the following Table VIII:

TABLE VIII

| Characteristic | Exemplary Styrene-Butadiene Copolymers | | | |
|---|---|---|---|---|
| Styrene/-Butadiene Ratio | 50/50 | 57/43 | 90/10 | 67/33 |
| Surfactant Type | Anionic | Anionic | Anionic | Anionic |
| Tg, °C. | −22 | −11 | 76 | 12 |
| pH | 9.0 | 6.0 | 6.5 | 9.0 |

All the styrene/butadiene copolymers described in above Table VIII also contain about 1 to about 3 weight percent copolymerized carboxylic acid (e.g., itaconic acid and acrylic acid).

A typical oil-based drilling fluid of this version of the present invention contains the ingredients and properties set forth in the following Table IX:

TABLE IX

| Ingredient | Typical | Preferred |
|---|---|---|
| Base oil, volume %$^a$ | 25–85 | 50–60 |
| Surfactant (active), ppb$^{b,c}$ | 1–20 | 1–10 |
| Water, volume %$^a$ | up to 45 | 10–20 |
| Weighting agent, ppb | up to 600 | 150–400 |
| Organophilic clay, ppb | 0.5–30 | 1–10 |
| Fluid loss control agent, ppb | up to 30 | 2–15 |
| Viscosifier, ppb | 0.02–2 | 0.05–1.5 |
| Shale inhibiting salt, ppb | up to 60 | 20–30 |
| Lime, ppb$^d$ | up to 30 | 1–10 |
| Property | | |
| Density, ppg$^e$ | 7.5–20 | 9–16 |

$^a$Volume percent is based on the total volume of the drilling fluid.
$^b$The pounds per barrel (ppb) is based upon the final composition of the drilling fluid.
$^c$The pounds per barrel (ppb) is based upon the final of the drilling fluid.
$^d$As used in the specification and claims, the term "lime" means quicklime (CaO), quicklime precursors, and hydrated quicklime (e.g., slaked lime (Ca(OH)$_2$)).
$^e$ppg denotes pounds per gallon.

An exemplary oil-based drilling fluid of the present invention for use in high temperature formations contains the ingredients and properties set forth below in Table X.

TABLE X

| Ingredient | Typical | Preferred |
|---|---|---|
| Oil, volume %$^a$ | 25–85 | 50–60 |
| Surfactant (active), pounds per barrel (ppb)$^{b,f}$ | 1–20 | 1–10 |
| Water, volume %$^a$ | up to 45 | 10–20 |
| Weighting agent, ppb | up to 600 | 150–400 |
| Organophilic clay, ppb | 0.5–30 | 1–10 |
| Non-polymeric fluid loss control agent, ppb | up to 30 | 2–15 |
| Polymeric fluid loss control agent, ppb$^c$ | 3–12 | 5–10 |
| Sulfonated elastomer polymeric viscosifier, ppb$^d$ | 0.02–2 | 0.05–1.5 |
| Shale inhibiting salt, ppb | up to 60 | 20–30 |
| Lime, ppb | up to 30 | 1–10 |
| Property | | |
| Density ppg$^e$ | 7.5–20 | 9–16 |

$^a$Volume percent is based on the total volume of the drilling fluid.
$^b$As used in the specification and claims, the term "surfactant" means a substance that, when present at low concentration in a system, has the property of adsorbing onto the surfaces or interfaces of the system and of altering to a marked degree the surface or interfacial free energies of those surfaces (or interfaces). As used in the foregoing definition of surfactant, the term "interface" indicates a boundary between any two immiscible phases and the term "surface" denotes an interface where one phase is a gas, usually air. Exemplary ingredients referred to as surfactants by those skilled in the art include emulsifiers and oil wetting agents.
$^c$The polymeric fluid loss control agent is preferably present in the drilling fluid in a concentration of about 6 to about 9 ppb.
$^d$The sulfonated elastomer polymeric viscosifier is preferably present in the drilling fluid in a concentration of about 0.1 to about 1 ppb.
$^e$ppg denotes pounds per gallon.
$^f$The pounds per barrel (ppb) is based upon the final composition of the drilling fluid.

The volumetric ratio of oil to water in the drilling fluids of the present invention can be as low as about 50:50.

Preferably, the weight ratio of the polymeric fluid loss control agent to the sulfonated elastomer polymeric viscosifier is about 1.5:1 to about 50:1, more preferably about 3:1 to about 20:1, and most preferably about 5:1 to about 10:1.

The drilling fluids are preferably prepared by mixing the constituent ingredients in the following order: (a) base oil, (b) organophilic clay, (c) surfactant, (d) lime, (e) an aqueous solution comprising water and the shale inhibiting salt, (f) non-polymeric fluid loss control agent, (g) weighting agent, (h) polymeric fluid loss control agent (when used), and (i) viscosifier.

The hydrophilic surfactant-containing drilling fluids enable the implementation of the following simplified drill cuttings cleaning and well casing cementing techniques. With reference to FIG. 1, in the simplified drill cutting cleaning process of the present invention, the drill cutting cleaning system 10 is modified such that oil-contaminated drill cuttings are transported by a conduit 16 from a first shaker screen 12 to a washer or second shaker screen 24. Accordingly, the modified drill cutting cleaning process makes use of the receiving hopper 14, the conveyor belt 18, the rotating drum 20, the addition of an external cleaning composition, and the conduit 22 optional, and, in fact, unnecessary. The remaining portion of the simplified drill cuttings process is the same as the drill cutting cleaning process described previously.

Hence, the hydrophilic surfactant-containing drilling fluid enables the use of a drill cutting cleaning process which requires virtually no additional chemical cost (the hydrophilic surfactant used in the drilling fluid can replace some, if not all, of the emulsifiers and wetting agents previously used in oil-based drilling fluids) and little additional equipment cost (since at least one shaker screen is conventionally used in drilling operations to separate the bulk of the drilling fluid from the drill cuttings). In addition, since drill cuttings coated with the hydrophilic surfactant-containing drilling fluids, when washed, can be discharged into the environment, the hydrophilic surfactant-containing drilling fluids of the present invention have the potential to render obsolete expensive alternative drilling fluids as well as costly conventional drill cuttings washing and reinjection procedures.

As noted above, when the hydrophilic surfactant-containing drilling fluid is employed to drill a borehole, a simplified well cementing technique can be used. The simplified well cementing technique employs all the steps and slugs of the cementing procedure described above with one exception, namely, the cleaning composition-containing slug 110 shown in FIG. 2 is rendered optional, and, in fact, not necessary.

The size of the rinse water slug 112 employed in this version of the well cementing process of the present invention is also dependent upon the parameters noted in the previously described well cementing process. Usually, the volume of the rinse water slug 112 employed in this embodiment of the well cementing process runs from about 0.01 to about 5, more commonly about 0.1 to about 4, even more commonly about 0.5 to about 3, and most commonly about 1 to about 2, times the sum of the annulus and interior volumes.

EXAMPLES

The following examples (which are intended to illustrate and not limit the invention, the invention being defined by the claims) describe (a) screening procedures used to identify surfactants suitable for use in the present invention (Examples 1–54); (b) the preparation of exemplary four-component cleaning compositions (Examples 55–59); (c) processes for cleaning drill cuttings (Examples 60–61, 63–67), (d) the preparation of an exemplary three-component cleaning composition (Example 62); (e) a set of comparative experiments for recovering oil from tar sands (Examples 68–71); and (f) procedures for removing spots (Examples 72 and 75), cleaning barbecue grills (Example 73), and treating oil-contaminated paper (Example 74).

Examples 1–54

Nonpolar Diluent Oil Solubility Test

To determine whether a surfactant is soluble in a nonpolar diluent oil, roughly 1 ml surfactant was dissolved in approximately 20 ml white mineral oil.

Polar Diluent Oil Solubility Test

If a surfactant was not soluble in the white mineral oil when subjected to the foregoing Nonpolar Diluent Oil Solubility Test, about 2 ml of the surfactant was dissolved in about 2 ml of d-limonene oil and/or about 2 ml of pine oil. If the surfactant was soluble in the polar diluent oil, the surfactant/polar diluent combination was combined with roughly 20 ml nonpolar diluent oil to determine whether the surfactant was soluble in the surfactant/polar diluent/nonpolar diluent-containing composition.

Alternatively, sometimes when the surfactant (roughly 1 ml) did not dissolve in the white mineral oil (approximately 20 ml), about 2 ml of limonene oil or 2 ml of pine oil was added to the surfactant/nonpolar diluent oil combination to determine whether the surfactant was soluble in the surfactant/polar diluent/nonpolar diluent-containing composition.

The surfactants were rated according to the following rating system and the results of the foregoing solubility tests are set forth below in Table A.

Solubility Rating Scale

| Rating | Performance |
| --- | --- |
| A | Soluble in white mineral oil |
| B | Soluble in white mineral oil in the presence of limonene and/or pine oil |
| C | Soluble in limonene and/or pine oil only |
| D | Insoluble in all oils tested |

Cleaning Test

To assess the cleaning efficacy of exemplary cleaning compositions of the present invention, a bottle brush having a brush diameter of about 1 inch and a brush length of about 4 inches was coated at one end with approximately 1–3 ml crude oil. The coated portion of the brush was then immersed, with stirring, for roughly 10 to 15 seconds in a cleaning composition that had received a rating of A, B, or C in the above-described Diluent Oil Solubility Tests. The treated brush was then taken out of the cleaning composition and rinsed with a strong spray of water.

In some instances, a cleaning composition was simply sprayed with a jet of water to determine the ability of the composition to foam or otherwise demonstrate its cleaning ability. The cleaning tests showed excellent correlation in that compositions that performed well in one also performed well in the other.

The detergency performance of the various surfactants tested were rated using the following scale.

Detergency Rating Scale

| Rating | Performance |
| --- | --- |
| 1 | Foamed and turned white (best) |
| 2 | Turned white |
| 3 | Foamed only |
| 4 | Lackluster performance |
| 5 | Formed calcium precipitate with water |
| 6 | Did nothing |

The results of the cleaning tests are also listed below in Table A.

Toxicity Rating Scale

The toxicity of the various surfactants employed in these examples were rated based upon publicly available information using the following system.

| Toxicity Rating Scale | |
| --- | --- |
| a | Non-toxic |
| b | Intermediate toxicity |
| c | Toxic |

The toxicity ratings of the surfactants are also set forth below in Table A.

TABLE A

| Ex | Trade Name | Generic Name | Class | Conc.[a] | Type | Rating[b] |
|---|---|---|---|---|---|---|
| 1 | Emsorb 2507 | Sorbitan tristearate | Sorbitan derivative | 100 | Nonionic | 5-A-a |
| 2 | Emsorb 2515 | Sorbitan monolaurate | Sorbitan derivative | 100 | Nonionic | 4-A-a |
| 3 | Emerest 2381 | Propylene glycol monostearate | Glycol ester | 100 | Anionic | 5-A-b |
| 4 | Emsorb 6907 | POE[c] (20) sorbitan tristearate | POE sorbitan derivative | 100 | Nonionic | 1-B-a |
| 5 | Emsorb 6915 | POE (20) sorbitan monolaurate | POE sorbitan derivative | 100 | Nonionic | 3-C-a |
| 6 | | Propylene carbonate | | | | 3-D-c |
| 7 | Emsorb 6900 | POE (20) sorbitan monooleate | POE sorbitan derivative | 100 | Nonionic | 3-C-a |
| 8 | Igepon AC-78 | Coconut acid ester of sodium isoethionate | Isethionate | 83 | Anionic | 3-C-b |
| 9 | Armeen DMHTD | Dimethyl hydrogenated tallow amine distilled | Dimethyl alkyl tertiary amine | 100 | Cationic | 4-A-c |
| 10 | Ethofat O-20 | POE (10) glycol oleate | POE glycol ester | 100 | Nonionic | 3-C-a |
| 11 | Antara LP-700 | Free acid of complex organic phosphate ester | Phosphate ester | 100 | Anionic | 3-D-b |
| 12 | Gafac PE-510 | Free acid of complex organic phosphate ester | Phosphate ester | 100 | Anionic | 1-C-b |
| 13 | Gafac Emulphor EL-719 | Polyoxyethylated vegetable oil | Ethoxylated fatty esters | 96 | Nonionic | 2-D-a |
| 14 | Petrostep A-60 | Dodecylbenzene sulfonic acid | | | | 4-A-b |
| 15 | Gantrez AN-149 | Methyl vinyl ether maleic anhydride copolymer | Vinyl & other polymeric resin | 100 | Anionic | 5-D-b |
| 16 | Ethomeen C/15 | POE (5) cocoamine | Ethoxylated amine | 100 | Cationic | 2-A-c |
| 17 | Ethomeen T/15 | POE (5) tallowamine | Ethoxylated amine | 100 | Cationic | 2-A-c |
| 18 | Ethomid O/15 | POE (5) oleamide | Ethoxylated amide | | Cationic | 1-B-c |
| 19 | Ethoduomeen T/13 | N,n' tris(2-hydroxymethyl)-n, tallow-1 diaminopropane | Ethoxylated amine | 100 | Cationic | 4-A-b |
| 20 | Armeen Z | N-cocoaminobutyric acid | | 100 | Amphoteric | 3-B-b |
| 21 | Ethofat O-15 | Polyethylene glycol oleic acids 5 moles EO per mole acid | Glycol ester | 100 | Nonionic | 2-B-a |
| 22 | Aromox C/12 | Bis(2-hydroxyethyl) cocoamine oxide | Tertiary amine oxide | 50 | Cationic | 3-C-c |
| 23 | Ethomeen 18/15 | POE (5) octadecyl amine | POE ethoxylated amine | | Cationic | 2-A-c |
| 24 | | Aluminum stearate | Fatty ester | | | 6-A-b |
| 25 | Emereat 2310 | Isopropyl isostearate | Fatty ester | | | 6-A-b |
| 26 | Armeen DMSD | Dimethyl soyanine | Disethyl alkyl tertiary amine | 100 | Cationic | 4-A-c |
| 27 | Emersal 6440 | Alkanolazine lauryl sulfate | Sulfate of alcohol | 75 | Anionic | 3-D-2 |
| 28 | Emsorb 2500 | Sorbitan monooleate | Sorbitan derivative | 100 | Nonionic | 6-A-a |
| 29 | Emery 6731 | Cocamide DEA lauryl sulfate | Sulfate of alcohol | 100 | Anionic/Nonionic | 3-D-b |
| 30 | Ethomeen O/15 | POE (10) oleylamine | Ethoxylated amine | | Cationic | 2-A-c |
| 31 | Aerosol OT-S | Dioctyl ester of sodium sulfosuccinic acid | Succinates, sulfo derivatives | 70 | Anionic | 3-A-b |
| 32 | | Monoethyl acid orthophosphate | Phosphate derivative | | | 6-D-b |
| 33 | Emersal 6430 | Ammonium lauryl sulfate | Sulfates of alcohol | 28 | Anionic | 3-D-b |
| 34 | Arquad 2C-75 | Dicoco dimethyl ammonium chloride | Quaternary surfactant | 75 | Cationic | 1-A-c |
| 35 | Aromox T/12 | Bis(2-hydroxyethyl) tallow amine oxide | Tertiary amine oxide | 50 | Cationic | 3-A-b |
| 36 | | Sodium 2-ethylhexyl sulfate | Sulfates sulfonates of oils | | | 6-D-b |
| 37 | Igepal CTA-639 | Alkylphenoxypoly-(ethyleneoxy)ethanol | Ethoxylated alkyl phenol | 100 | Nonionic | 1-C-b |
| 38 | Span 85 | Sorbitan trioleate | Sorbitan derivative | 100 | Nonionic | 6-A-a |
| 39 | | Polyvinyl pyrrolidone | Heterocyclic | | | 3-D-3 |
| 40 | Triton H-55 | Phosphate surfactant, potassium salt | Phosphate ester | 50 | Anionic | 3-D-b |
| 41 | Triton QS-30 | Phosphate surfactant in free acid form | Phosphate ester | 90 | Anionic | 3-B-b |
| 42 | Ninol 128 extra | Fatty acid alkanolamide | Alkanolamide | | Nonionic | 2-C-c |
| 43 | | Glycerol monostearate | Glycerol ester | | | 1-B-a |

TABLE A-continued

| Ex | Trade Name | Generic Name | Class | Conc.[a] | Type | Rating[b] |
|---|---|---|---|---|---|---|
| 44 | Surflo OW-1 | Oxyethylated glycerol ester of a fatty acid | Ethoxylated fatty esters & oils | 58 | Nonionic | 3-D-a |
| 45 | Witcamide 5130 | Modified alkanolamide | Alkanolamide | 98 | Anionic/ Nonionic | 6-D-c |
| 46 | Igepon T-27 | Sodium n-methyl-n-oleyl laurate | Lanolin-based derivative | 67 | Anionic | 6-D-a |
| 47 | Tween 40 | POE (20) sorbitan monopalmitate | POE sorbitan derivative | 100 | Nonionic | 3-C-a |
| 48 | Atmul 651k | Kosher mono & diglycerides | Monoglycerides & derivatives | 100 | Nonionic | 6-B-1 |
| 49 | Tween 21 | POE (4) sorbitan monolaurate | POE sorbitan derivative | 100 | Nonionic | 1-B-a |
| 50 | Tween 85 | POE (20) sorbitan trioleate | POE sorbitan derivative | 100 | Nonionic | 3-C-a |
| 51 | Alipal CD 128 | Ammonium salt of ethoxylate sulfate | Sulfates of ethoxylated alcohol | 58 | Anionic | 3-C-b |
| 52 | Alipal EP-110 | Ammonium salt of sulfated nonylphenoxy-poly(ethyleneoxy)ethanol | Sulfates of EO alkyl phenol | 30 | Anionic | 3-C-b |
| 53 | Alkanol DW | sodium alkylaryl sulfonate | Sulfates of alkylaryl | | Anionic | 3-C-b |
| 54 | Span 40 | Sorbitan monopalmitate | Sorbitan derivative | 100 | Nonionic | 5-A-a |

[a]Conc. denotes percent active ingredient in the material tested.
[b]The ratings are in accordance with the detergency, solubility, and toxicity rating scales noted above.
[c]POE denotes "polyoxyethylene".

The results listed in Table A indicate that certain surfactants dissolve in nonpolar and/or polar diluent oils and that certain of the resulting compositions remove contaminant oil from a substrate.

Examples 55–59

Preparation of Exemplary Four-Component Cleaning Compositions

In each of Examples 55–59, a cleaning composition was prepared by dissolving Emsorb 6907 brand POE (20) sorbitan tristearate in d-limonene with gentle heating at a temperature of about 37.8° C. (100° F.) to about 48.9° C. (120° F). The resulting mixture was then blended with a nonpolar diluent oil to form a blend. Emsorb 6900 brand POE (20) sorbitan monooleate was then added to the blend to form the cleaning composition. The weight and weight percent of each additive and the specific nonpolar diluent oil used are noted in the following Table B.

The composition of Example 55 remains in a solution state at temperatures down to about 18.3° C. (65° F). Techniques for keeping the composition of Example 55 in or close to a solution state at temperatures below about 18.3° C. (65° F.) include (a) replacing some or all of the white mineral oil with a more polar diluent (e.g., Petrofree brand ester or d-limonene), and/or (b) reducing the concentration one or more of the hydrophilic surfactants (e.g., the concentration of Emsorb 6907 brand POE (20) sorbitan tristearate).

Examples 60–61

Drill Cuttings Cleaning Process

Old, dehydrated drill cuttings (about 100 g) coated with a drilling fluid that contained LVT-200 brand base oil was mixed with gentle stirring (roughly 5 minutes) with various amounts of the cleaning composition prepared in above Example 55. The cleaning composition-coated drill cuttings

TABLE B

Exemplary Cleaning Compositions

| | Example | | | | | | | | | |
|---|---|---|---|---|---|---|---|---|---|---|
| | 55 | | 56 | | 57 | | 58 | | 59 | |
| Ingredient | g | wt % | g | wt % | g | wt % | g | wt % | g | wt % |
| POE(20)sts[a] | 3.3 | 9 | 10 | 14.7 | 3.5 | 9.5 | 10 | 14.6 | 3.3 | 9 |
| d-limonene | 3 | 8.2 | 8.5 | 12.5 | 3 | 8.2 | 8.5 | 12.4 | 3 | 8.2 |
| wmo[b] | 29 | 79.2 | 44 | 64.7 | 0 | 0 | 0 | 0 | 0 | 0 |
| fae[c] | 0 | 0 | 0 | 0 | 29 | 78.8 | 44 | 64.2 | 0 | 0 |
| diesel | 0 | 0 | 0 | 0 | 0 | 0 | 0 | 0 | 29 | 79.2 |
| POE(20)smo[d] | 1.3 | 3.6 | 5.5 | 8.1 | 1.3 | 3.5 | 6 | 8.8 | 1.3 | 3.6 |

[a]"POE(20)sts" denotes Emsorb 6907 brand POE (20) sorbitan tristearate.
[b]"wmo" denotes Peneteck brand white mineral oil.
[c]"fae" denotes Petrofree brand ester.
[d]"POE(20)smo" denotes Emsorb 6900 brand POE (20) sorbitan monooleate.

were then put on an 100 mesh screen and vigorously sprayed with water. The results of these experiments are summarized in the following Table C.

TABLE C

Drill Cutting Cleaning Results

| Example | Cleaning Composition, g | Concentration On Cuttings, wt %[a] | Results |
|---|---|---|---|
| 60 | 20 | 200 | No Oily Odor |
| 61 | 2 | 20 | No Oily Odor |

[a]The weight percent is based upon the weight of the cleaning composition divided by the weight of the drilling fluid-coated drill cuttings, the quotient being multiplied by 100%.

Based upon previous observations, cleaned drill cuttings, which have no oily odor, also pass the sheen test and typically contain less than about 1 weight percent residual oil, based on the dry weight of the cleaned cuttings. To confirm that the cleaned drill cuttings could pass the sheen test, the cleaned cuttings were ground using a mortar and pestle, placed in a centrifuge tube containing about 60 g water, and centrifuged (at about 3,000 g force). After being centrifuged, no sheen was observed on the water in the centrifuge tube.

Example 62

Preparation of Exemplary Three-Component Cleaning Composition

A three component cleaning composition was prepared by dissolving about 3.3 g Emsorb 6907 brand POE (20) sorbitan tristearate in about 3 g d-limonene with gentle heating at a temperature of about 37.8° C. (100° F.) to about 48.9° C. (120° F.). The resulting mixture was then blended with about 1.3 g Emsorb 6900 brand POE (20) sorbitan monooleate to form the cleaning composition.

Examples 63–64

Drill Cuttings Cleaning Process

Old, dehydrated drill cuttings (about 10 g) coated with a drilling fluid that contained LVT-200 brand base oil was mixed with gentle stirring (roughly 5 minutes) with various amounts of the cleaning composition prepared in above Example 62. The cleaning composition-coated drill cuttings were then put on an 100 mesh screen and vigorously sprayed with water. The results of these experiments are summarized in the following Table D.

TABLE D

Drill Cutting Cleaning Results

| Example | Cleaning Composition, g | Concentration On Cuttings, wt %[a] | Results Odor | Oily Residual Oil, wt %[b] |
|---|---|---|---|---|
| 63 | 1.6 | 3.3 | Slight | 5.6 |
| 64 | N/M[c] | >100 | Slight | 3.6 |

[a]The weight percent is based upon the weight of the cleaning composition divided by 5 g (the presumed weight of the drilling fluid on 10 g of coated drill cuttings), the quotient being multiplied by 100%.
[b]The weight percent residual oil (as determined by a laboratory retort analysis) in based on the dry weight of the cleared cuttings.
[c]"N/M" means not measured.

Example 65

Drill Cuttings Cleaning Process

A drilling fluid (about 50 g) having the makeup shown in the following Table E was mixed with about 50 g of shale having a particle size of about 5–7 mesh.

TABLE E

Drilling Fluid Composition

| Ingredient | Quantity |
|---|---|
| Conoco LVT-200 brand base oil | 0.58 bbl |
| Invermul NT brand blend of amine derivatives and tall oil fatty acids | 8 lb/bbl |
| EZmul NT brand blend of amine derivatives | 4 lb/bbl |
| Duratone HT brand amine treated lignite | 6 lb/bbl |
| Lime | 8 lb/bbl |
| Geltone II brand amine bentonite | 5 lb/bbl |
| Water | 0.13 bbl |
| $CaCl_2$ | 37.4 lb/bbl |
| RM63 brand polymer | 1 lb/bbl |
| Barite | 263 lb/bbl |
| Rev Dust brand simulated drill solids | 10 lb/bbl |

Next, the drilling fluid coated shale was mixed with gentle stirring (roughly 5 minutes) with about 1.6 g of the cleaning composition prepared in above Example 62. The resulting mixture was then put on an 100 mesh screen and vigorously sprayed with water. The cleaned shale was devoid of any oily odor and had a residual oil content of about 1.5 weight percent based on the dry weight of the cleaned cuttings.

Example 66

Drill Cuttings Cleaning Process

The drilling fluid (about 50 g) described in above Table E was mixed with about 50 g of shale having a particle of about 5–7 mesh. Next, the drilling fluid coated shale was mixed with gentle stirring (roughly 5 minutes) with about 7.95 g of the cleaning composition prepared in above Example 55. The resulting mixture was then put on an 100 mesh screen and vigorously sprayed 5 with water. The cleaned shale was devoid of any oily odor and had a residual oil content of about 0.82 weight percent based on the dry weight of the cleaned cuttings.

Example 67

Drill Cuttings Cleaning Process

The procedure described in Example 66 was repeated with one modification, namely, the shale was ground to reduce the particle size. The cleaned shale obtained using this modified procedure was also devoid of any oily odor, but had a residual oil content of about 1.4 weight percent based on the dry weight of the cleaned cuttings.

Examples 68–71

Tar Sands Oil Recovery Processes

The following protocol was employed in each of Examples 68–71. Oil-wet tar sand was simulated by coating fine silica sand (about 40–60 mesh) with an extremely viscous, tarry crude oil (about 5–10 API gravity). (The simulated tar sand contained about 10 weight percent crude oil.) The simulated tar sand (about 50 g) was contacted with a composition, using gentle stirring, for about 5 minutes to dissolve the heavy crude in the composition and form a slurry. Next, the slurry was placed on a 100 mesh screen. Water was then sprayed on the slurry. The wash water was allowed to flow into a large beaker, where any oil separation was observed. Finally, the clean sand was analyzed or observed to determine the oil content of the clean sand. The results of these experiments are reported in the following Table F.

TABLE F

| Ex | Composition | Amount | Results |
|---|---|---|---|
| 67 | Cleaning composition of Example 59 | 5 g | 0 wt % residual oil on cleaned sand (by retort analysis). Recovered oil separated slowly from the wash water. |
| 68 | Cleaning composition of Example 59 (1 part) diluted with diesel oil (5 parts) | 5 g | No residual oil on cleaned sand (by observation). Recovered oil separated rapidly from wash water. |
| 69 | Diesel | 5 g | Most of the oil remained on the simulated tar sands. |
| 70 | Cleaning composition of Example 62 | 5 g | Substantially all of the oil remained on the simulated tar sands. |

The results reported in the above Table F indicate that oil can be very effectively extracted from tar sands using the cleaning composition of Example 59. In addition, chemical costs can be reduced and oil separation enhanced without sacrificing extraction efficiency by using very low concentrations of the cleaning compositions of Example 59. Furthermore, while the cleaning composition of Example 62 has many suitable applications, e.g., use in an oil-based drilling fluid for cleaning drill cuttings, it is not effective for removing oil from tar sands. The reason for the latter result is that the cleaning composition of Example 62 lacks a sufficient amount of a diluent oil (e.g., diesel, mineral oil) having the ability to lower the viscosity of the viscous oil on the simulated tar sands and distribute the hydrophilic surfactants throughout such viscous oil. Accordingly, the composition of Example 62 would be effective for removing oil from tar sands if it were used in larger amounts and/or if it were reformulated to contain a higher concentration of d-limonene.

Example 72

Spot Remover

Crude oil was accidently splashed onto a sleeve cuff of a shirt and formed an oily spot (about 0.64 cm (0.25 inch) in diameter). The cleaning composition of Example 57 (roughly 1–2 ml) was applied and rubbed into the spotted portion of the cuff. After waiting a few seconds, the treated area of the cuff was sprayed with water. This procedure completely removed the oily spot from the garment.

Example 73

Barbecue Grill Cleaner

The cleaning composition of Example 55 was liberally applied with a dry dish brush to a well used barbecue grill caked with food grease and smoke residue. The cleaning was done on a patio and a scouring pad was used on areas of the grill that were highly carbonized. After being rinsed with a garden hose, the treated grill, the dish brush, and the patio were virtually spotless.

Example 74

Process For Treating Oil-Contaminated Paper

Fine, oil-coated paper particles containing about 5 weight percent lubricant oil were treated with the cleaning composition of Example 55 (about 5 weight percent of the cleaning composition was employed based on the weight of the oil-coated paper treated). The resulting mixture was thoroughly kneaded and then placed on a 100 mesh screen and rinsed with water. The cleaned paper particles exhibited no oily smell and looked the same as another sample of the oil-coated paper that had been treated with an excessive amount of pentane.

Example 75

Spot Remover

Pants soiled with about four motor oil spots (each spot being about 2.54 cm (1 inch)) were washed using a commercial detergent in a washing machine. The spots were still on the washed pants. About 5–10 ml of the cleaning composition of Example 55 was then applied and rubbed into each spot. After waiting a few seconds, the treated areas of the pants were sprayed with water. This cleaning composition completely removed the motor oil spots from the pants. The cleaned pants were then washed with the commercial detergent in the washing machine to remove any residual cleaning composition While a detergent was used when the cleaned pants were washed in the washing machine, none was actually necessary. In fact, after rubbing the cleaning composition into the spots, the pants could simply have been rinsed in the washing machine with just water.

Although the present invention has been described in detail with reference to some of the preferred embodiments, other versions are possible. For example, in addition to using the cleaning compositions of the present invention in the above-described drill cuttings wash, well casing cementing, and oil lifting techniques, other oil- and surfactant-containing compositions can be employed. Exemplary of such other compositions include, but are not limited to, those described in Japanese Patent 5098297, Japanese Patent 5098292, Japanese Patent 5098283, Japanese Patent 4110400, European Patent 426942, Japanese Patent 2248500, Japanese Patent 2123199, East German Patent 268971, Japanese Patent 1092295, and U.S. Pat. No. 4,707,293, these documents being incorporated herein in their entireties by reference.

Also, with reference to FIG. 1, in addition to or in place of introducing the cleaning composition through conduit 22 to contact the drill cuttings in the rotating drum 20, the cleaning composition can also be introduced through another conduit (not shown) to contact the drill cuttings as they are being transported on the conveyor belt 18. Furthermore, a stirred vessel can be used in place of the rotating drum 20 to mix the cleaning composition and drill cuttings.

Another variation in the drill cuttings cleaning system shown in FIG. 1 entails recycling the separated oil leaving the separator 30 through the conduit 34 for reuse as part or all of the oil portion of the cleaning fluid composition injected into the rotating drum 20 through conduit 22. In this embodiment of the invention, make-up surfactant is introduced into the recycled oil to form the cleaning composition injected into rotating drum 20.

Likewise, the water exiting the separator 30 through the conduit 38 in FIG. 1 is optionally recycled and used as the rinse water sprayed through the conduit 26 onto the cleaning composition-coated drill cuttings located on the shaker screen 24.

Additionally, in the well cementing process of the present invention, a slug of fluid (e.g., diesel, kerosene) is optionally inserted between the oil-based drilling mud and the slug of the cleaning composition.

Furthermore, the cleaning compositions of the present invention can be used to remove oil-soluble paint (e.g., graffiti made using a spray can that employs an organic carrier vehicle). In addition, the cleaning compositions can efficaciously cleanse the human body, e.g., they can replace facial and bath soaps for removing natural or excessive oil build-up as well as supplant harsh cleansers used for scrubbing hands soiled with oil and/or grease. Also, these cleaning compositions can be employed as a machine lubricant.

In view of the numerous additional embodiments noted above, the spirit and scope of the appended claims should not necessarily be limited to the description of the preferred versions contained herein.

What is claimed is:

1. A method for cleaning an oil-coated substrate, the method comprising the sequential steps of:
    (A) contacting at least a portion of the oil-coated substrate with a solution comprising:
        (a) a first surfactant having a HLB value of at least 10;
        (b) a second surfactant having a higher HLB value, where the difference in the HLB values of the first and second surfactants is at least 3 and a mixture of the surfactants has a HLB value of at least 11,
        (c) at least one nonpolar diluent oil; and
        (d) less than about 5 volume percent water wherein the volume percent is based on the total amount of surfactant, diluent oil, and water present in the solution; and
    (B) rinsing at least a portion of the oil-coated substrate contacted in step (A) with water.

2. The method of claim 1 where the oil-coated substrate comprises an oil-spotted fabric.

3. The method of claim 1 where the oil-coated substrate is selected from group consisting of oil-soiled cooking and eating utensils.

4. The method of claim 1 where the oil-coated substrate comprises a human body.

5. The method of claim 1 where the mixture of the surfactants has a HLB value of at least about 12.

6. The method of claim 1 where the mixture of the surfactants has a HLB value of at least about 13.

7. The method of claim 1 where at least one of the surfactants is insoluble in a comparative material consisting of the insoluble surfactant and the at least one diluent oil present in the solution, the respective volumes of the insoluble surfactant and the at least one diluent oil in the comparative material being the same as employed in the solution.

8. The method of claim 1 where the first surfactant comprises a first polyoxyethylene sorbitan fatty acid ester and the second surfactant comprises a second polyoxyethylene sorbitan fatty acid ester.

9. The method of claim 1 where the first surfactant is selected from the group consisting of polyoxyethylene (20) sorbitan trioleate, polyoxyethylene (20) sorbitan tristearate, and polyoxyethylene (4) sorbitan monolaurate and the second surfactant is selected from the group consisting of polyoxyethylene (20) sorbitan monooleate and polyoxyethylene (20) sorbitan monopalmitate.

10. The method of claim 1 where the first surfactant comprises a first polyoxyethylene sorbitan fatty acid ester, the second surfactant comprises a second polyoxyethylene sorbitan fatty acid ester, and, based upon the weight of the individual ingredients in the solution, the at least one nonpolar diluent oil comprises the major ingredient in the solution.

11. The method of claim 1 where the first surfactant is selected from the group consisting of polyoxyethylene (20) sorbitan trioleate, polyoxyethylene (20) sorbitan tristearate, and polyoxyethylene (4) sorbitan monolaurate and the second surfactant is selected from the group consisting of polyoxyethylene (20) sorbitan monooleate and polyoxyethylene (20) sorbitan monopalmitate and, based upon the weight of the individual ingredients in the solution, the at least one nonpolar diluent oil comprises the major ingredient in the solution.

12. The method of claim 1 where the solution further comprises a polar diluent oil and comprises less than about 10 volume percent of all ingredients other than surfactants and diluent oils wherein the volume percent is based on the total volume of the solution.

13. The method of claim 1 where the solution further comprises a polar diluent oil and comprises less than about 5 volume percent of all ingredients other than surfactants and diluent oils wherein the volume percent is based on the total volume of the solution.

14. The method of claim 1 where the solution further comprises a polar diluent oil and comprises less than about 1 volume percent of all ingredients other than surfactants and diluent oils wherein the volume percent is based on the total volume of the solution.

15. The method of claim 1 where the solution further comprises a polar diluent oil and comprises less than about 0.5 volume percent of all ingredients other than surfactants and diluent oils wherein the volume percent is based on the total volume of the solution.

16. The method of claim 1 where the solution further comprises a polar diluent oil and comprises less than about 0.01 volume percent of all ingredients other than surfactants and diluent oils wherein the volume percent is based on the total volume of the solution.

17. The method of claim 1 where the difference in the HLB values of the first and second surfactants is at least about 3.5.

18. The method of claim 1 where the difference in the HLB values of the first and second surfactants is at least about 4.

19. The method of claim 1 where the difference in the HLB values of the first and second surfactants is at least about 4.5.

20. The method of claim 21 where the difference in the HLB values of the first and second surfactants is at least about 5.

21. A method for cleaning an oil-coated substrate, the method comprising the sequential steps of:
    (A) contacting at least a portion of the oil-coated substrate with a solution comprising:
        (a) at least one nonpolar diluent oil;
        (b) a first polyoxyethylene sorbitan fatty acid ester surfactant having a HLB value of at least 10;
        (c) a second polyoxyethylene sorbitan fatty acid ester surfactant having a higher HLB, where the difference in the HLB values of the first and second surfactants is at least 3, a mixture of the surfactants having a HLB value of at least 11, and the total concentration of such surfactants in the solution is about 5 to about 30 volume percent; and
        (d) less than about 5 volume percent water wherein the volume percent is based on the total amount of surfactant, diluent oil, and water present in the solution; and
    (B) rinsing at least a portion of the oil-coated substrate contacted in step (A) with water.

22. The method of claim 21 where the solution further comprises at least one polar diluent oil and comprises less than about 10 volume percent of all ingredients other than the diluent oils and the surfactants.

23. The method of claim 21 where the solution further comprises at least one polar diluent oil and comprises less than about 5 volume percent of all ingredients other than the diluent oils and the surfactants.

24. The method of claim 21 where the solution further comprises at least one polar diluent oil and comprises less than about 1 volume percent of all ingredients other than the diluent oils and the surfactants.

25. The method of claim 21 where the solution further comprises at least one polar diluent oil and comprises less than about 0.05 volume percent of all ingredients other than the diluent oils and the surfactants.

26. The method of claim 21 where the solution further comprises at least one polar diluent oil and comprises less than about 0.01 volume percent of all ingredients other than the diluent oils and the surfactants.

27. The method of claim 21 where the mixture of surfactants has a HLB value of at least about 12.

28. The method of claim 21 where the mixture of surfactants has a HLB value of at least about 13.

29. The method of claim 21 where at least one of the surfactants is insoluble in a comparative material consisting of the insoluble surfactant and the at least one diluent oil present in the solution, the respective volumes of the insoluble surfactant and the at least one diluent oil in the comparative material being the same as employed in the solution.

30. The method of claim 21 where the difference in the HLB values of the first and second surfactants is at least about 3.5.

31. The method of claim 21 where the difference in the HLB values of the first and second surfactants is at least about 4.

32. The method of claim 21 where the difference in the HLB values of the first and second surfactants is at least about 4.5.

33. The method of claim 21 where the difference in the HLB values of the first and second surfactants is at least about 5.

34. The method of claim 21 where the nonpolar diluent oil is the major ingredient in the solution based upon the weight of each ingredient in the solution.

35. A method for cleaning an oil-coated substrate, the method comprising the sequential steps of:
(A) contacting at least a portion of the oil-coated substrate with a solution comprising:
(a) a nonpolar diluent oil;
(b) a first surfactant having a HLB value of at least 10, the first surfactant being selected from the group consisting of polyoxyethylene (20) sorbitan trioleate, polyoxyethylene (20) sorbitan tristearate, and polyoxyethylene (4) sorbitan monolaurate;
(c) a second surfactant having a higher HLB value, the second surfactant being selected from the group consisting of polyoxyethylene (20) sorbitan monooleate and polyoxyethylene (20) sorbitan monopalmitate, where the difference in HLB values of the first and second surfactants is at least 3, and the total concentration of the surfactants in the solution is about 5 to about 30 volume percent; and
(d) less than about 5 volume percent water wherein the volume percent is based on the total amount of surfactants, diluent oil, and water present in the solution; and (B) rinsing at least a portion of the oil-coated substrate contacted in step (A) with water.

36. The method of claim 35 where the difference in the HLB values of the first and second surfactants is at least about 3.5.

37. The method of claim 35 where the difference in the HLB values of the first and second surfactants is at least about 4.

38. The method of claim 35 where the difference in the HLB values of the first and second surfactants is at least about 4.5.

39. The method of claim 35 where the difference in the HLB values of the first and second surfactants is at least about 5.

40. The method of claim 35 where the nonpolar diluent oil is the major ingredient in the solution based upon the weight of each ingredient in the solution.

41. A method for cleaning an oil-coated substrate, the method comprising the sequential steps of:
(A) contacting at least a portion of the oil-coated substrate with a composition comprising:
(a) a nonpolar diluent oil selected from the group consisting of white mineral oils, paraffinic solvents, and mixtures thereof;
(b) a polyoxyethylene (20) sorbitan trioleate surfactant;
(c) a polyoxyethylene (20) sorbitan monooleate surfactant, where a mixture of the polyoxyethytene (20) sorbitan trioleate surfactant and the polyoxyethylene (20) sorbitan monooleate surfactant has a HLB value of at least 11 and the combined concentration of the polyoxyethylene (20) sorbitan trioleate and the polyoxyethylene (20) sorbitan monooleate in the solution is about 5 to about 30 volume percent based on the total volume of the surfactants and diluent oils in the solution; and (B) rinsing at least a portion of the oil-coated substrate contacted in step (A) with water.

42. The method of claim 41 where the composition comprises less than about 5 volume percent water wherein the volume percent is based on the total amount of surfactants, diluent oil, and water present in the composition.

43. A method for cleaning an oil-coated substrate, the method comprising the sequential steps of:
(A) contacting at least a portion of the oil-coated substrate with a composition comprising:
(a) a nonpolar diluent oil selected from the group consisting of white mineral oils, paraffinic solvents, and mixtures thereof;
(b) a polar diluent oil selected from the group consisting of plant oils, animal oils, and mixtures thereof;
(c) a polyoxyethylene (20) sorbitan trioleate surfactant; and
(d) a polyoxyethylene (20) sorbitan monooleate surfactant, where a mixture of the polyoxyethylene (20) sorbitan trioleate surfactant and the polyoxyethylene (20) sorbitan monooleate surfactant has a HLB value of at least 11 and the combined concentration of the polyoxyethylene (20) sorbitan trioleate and the polyoxyethylene (20) sorbitan monooleate in the solution is about 5 to about 30 volume percent based on the total volume of the surfactants and diluent oils in the solution; and (B) rinsing at least a portion of the oil-coated substrate contacted in step (A) with water.

44. The method of claim 43 where the composition comprises less than about 5 volume percent water wherein the volume percent is based on the total amount of surfactants, diluent oil, and water present in the composition.

45. The method of claim 43 where the polar diluent oil is selected from the group consisting of d-limonene, d-pinene, sesquiterpene, cerin, and mixtures thereof.

46. The method of claim 43 where the nonpolar diluent oil is the major ingredient in the solution based upon the weight of each ingredient in the solution.

47. A method for cleaning an oil-coated substrate, the method comprising the sequential steps of:
   (A) contacting at least a portion of the oil-coated substrate with a composition comprising:
   (a) a first diluent oil comprising a white mineral oil;
   (b) a second diluent oil comprising d-limonene;
   (c) a first surfactant comprising polyoxyethylene (20) sorbitan trioleate;
   (d) a second surfactant comprising polyoxyethylene (20) sorbitan monooleate, where a mixture of the polyoxyethylene (20) sorbitan trioleate surfactant and the polyoxyethylene (20) sorbitan monooleate surfactant has a HLB value of at least 11 and the combined concentration of the polyoxyethylene (20) sorbitan trioleate and the polyoxyethylene (20) sorbitan monooleate in the composition is about 5 to about 30 volume percent based on the total volume of the surfactants and diluent oils in the composition; and
   (B) rinsing at least a portion of the oil-coated substrate contacted in step (A) with water.

48. The method of claim 47 where the composition comprises less than about 5 volume percent water wherein the volume percent is based on the total amount of surfactants, diluent oil, and water present in the composition.

49. The method of claim 47 where the white mineral oil is the major ingredient in the composition based upon the weight of each ingredient in the composition.

50. The method of claim 47 where the combined concentration of the polyoxyethylene (20) sorbitan trioleate and the polyoxyethylene (20) sorbitan monooleate in the composition is about 10 to about 20 volume percent based on the total volume of the surfactants and diluent oils in the composition.

51. The method of claim 47 where the mixture of the polyoxyethylene (20) sorbitan trioleate surfactant and the polyoxyethylene (20) sorbitan monooleate surfactant has a HLB value of at least about 12.

52. The method of claim 47 where the mixture of the polyoxyethylene (20) sorbitan trioleate surfactant and the polyoxyethylene (20) sorbitan monooleate surfactant has a HLB value of at least about 13.

53. The method of claim 47 where the polyoxyethylene (20) sorbitan trioleate surfactant and the polyoxyethylene (20) sorbitan monooleate surfactant comprise at least about 90 percent of the total weight of all surfactants present in the composition.

54. The method of claim 47 where the composition comprises less than about 10 volume percent of all ingredients other than the white mineral oil, the d-limonene, the polyoxyethylene (20) sorbitan trioleate surfactant, and the polyoxyethylene (20) sorbitan monooleate surfactant wherein the volume percent is based on the total volume of the composition.

55. The method of claim 47 where the composition comprises less than about 5 volume percent of all ingredients other than the white mineral oil, the d-limonene, the polyoxyethylene (20) sorbitan trioleate surfactant, and the polyoxyethylene (20) sorbitan monooleate surfactant wherein the volume percent is based on the total volume of the composition.

56. The method of claim 47 where the composition comprises less than about 1 volume percent of all ingredients other than the white mineral oil, the d-limonene, the polyoxyethylene (20) sorbitan trioleate surfactant, and the polyoxyethylene (20) sorbitan monooleate surfactant wherein the volume percent is based on the total volume of the composition.

57. The method of claim 47 where the composition comprises less than about 0.5 volume percent of all ingredients other than the white mineral oil, the d-limonene, the polyoxyethylene (20) sorbitan trioleate surfactant, and the polyoxyethylene (20) sorbitan monooleate surfactant wherein the volume percent is based on the total volume of the composition.

58. The method of claim 47 where the composition comprises less than about 0.01 volume percent of all ingredients other than the white mineral oil, the d-limonene, the polyoxyethylene (20) sorbitan trioleate surfactant, and the polyoxyethylene (20) sorbitan monooleate surfactant wherein the volume percent is based on the total volume of the composition.

59. The method of claim 47 where the concentration of the polyoxyethylene (20) sorbitan trioleate surfactant is greater than the concentration of the polyoxyethylene (20) sorbitan monooleate surfactant in the composition.

60. The method of claim 47 where the concentration of the polyoxyethylene (20) sorbitan trioleate surfactant is more than double the concentration of the polyoxyethylene (20) sorbitan monooleate surfactant in the composition.

61. A method for cleaning an oil-coated substrate, the method comprising the sequential steps of:
   (A) contacting at least a portion of the oil-coated substrate with a composition comprising:
   (a) a first surfactant having a HLB value of at least 10;
   (b) a second surfactant having a higher HLB value, where the difference in the HLB values of the first and second surfactants is at least 3 and a mixture of the surfactants has a HLB value of at least 11; and
   (c) at least one nonpolar diluent oil; and
   (B) rinsing at least a portion of the oil-coated substrate contacted in step (A) with water.

62. The method of claim 61 where the composition comprises less than about 5 volume percent water wherein the volume percent is based on the total amount of surfactants, diluent oil, and water present in the composition.

63. A method for cleaning an oil-coated substrate, the method comprising the sequential steps of:
   (A) contacting at least a portion of the oil-coated substrate with a composition comprising:
   (a) a first surfactant having a HLB value of at least 10;
   (b) a second surfactant having a higher HLB value, where the difference in the HLB values of the first and second surfactants is at least 3 and a mixture of the surfactants has a HLB value of at least 11;
   (c) a nonpolar diluent oil; and
   (d) a polar diluent oil; and
   (B) rinsing at least a portion of the oil-coated substrate contacted in step (A) with water.

64. The method of claim 63 where the composition comprises less than about 5 volume percent water wherein the volume percent is based on the total amount of surfactants, diluent oil, and water present in the composition.

65. The method of claim 63 where the composition comprises less than about 10 volume percent of all ingredients other than the first surfactant, the second surfactant, the nonpolar diluent oil, and the polar diluent oil wherein the volume percent is based on the total volume of the composition.

66. The method of claim 63 where the nonpolar diluent oil is the major ingredient in the solution based upon the weight of each ingredient in the composition.

67. A method for cleaning an oil-coated substrate, the method comprising the sequential steps of:

(A) contacting at least a portion of the oil-coated substrate with a composition comprising:
(a) at least one nonpolar diluent oil;
(b) a first polyoxyethylene sorbitan fatty acid ester surfactant having a HLB value of at least 10; and
(c) a second polyoxyethylene sorbitan fatty acid ester surfactant having a higher HLB, where the difference in the HLB values of the first and second surfactants is at least 3, a mixture of the surfactants has a HLB value of at least 11, and the total concentration of such surfactants in the solution is about 5 to about 30 volume percent; and (B) rinsing at least a portion of the oil-coated substrate contacted in step (A) with water.

68. The method of claim 67 where the composition comprises less than about 5 volume percent water wherein the volume percent is based on the total amount of surfactants, diluent oil, and water present in the composition.

69. A method for cleaning an oil-coated substrate, the method comprising the sequential steps of:

(A) contacting at least a portion of the oil-coated substrate with a composition comprising:
(a) a nonpolar diluent oil;
(b) a polar diluent oil;
(c) a first polyoxyethylene sorbitan fatty acid ester surfactant having a HLB value of at least 10; and
(d) a second polyoxyethylene sorbitan fatty acid ester surfactant having a higher HLB, where the difference in the HLB values of the first and second surfactants is at least 3, a mixture of the surfactants has a HLB value of at least 11, and the total concentration of such surfactants in the solution is about 5 to about 30 volume percent; and (B) rinsing at least a portion of the oil-coated substrate contacted in step (A) with water.

70. The method of claim 69 where the composition comprises less than about 5 volume percent water wherein the volume percent is based on the total amount of surfactants, diluent oil, and water present in the composition.

71. The method of claim 69 where the composition comprises less than about 10 volume percent of all ingredients other than the nonpolar diluent oil, the polar diluent oil, the first polyoxyethylene sorbitan fatty acid ester surfactant, and the second polyoxyethylene sorbitan fatty acid ester surfactant wherein the volume percent is based on the total volume of the composition.

72. The method of claim 69 where the nonpolar diluent oil is the major ingredient in the solution based upon the weight of each ingredient in the composition.

73. A method for cleaning an oil-coated substrate, the method comprising the sequential steps of:

(A) contacting at least a portion of the oil-coated substrate with a composition comprising:
(a) a nonpolar diluent oil;
(b) a first surfactant having a HLB value of at least 10, the first surfactant being selected from the group consisting of polyoxyethylene (20) sorbitan trioleate, polyoxyethylene (20) sorbitan tristearate, and polyoxyethylene (4) sorbitan monolaurate; and
(c) a second surfactant having a higher HLB value, the second surfactant being selected from the group consisting of polyoxyethylene (20) sorbitan monooleate and polyoxyethylene (20) sorbitan monopalmitate, where the difference in HLB values of the first and second surfactants is at least 3, and the total concentration of the surfactants in the composition is about 5 to about 30 volume percent; and (B) rinsing at least a portion of the oil-coated substrate contacted in step (A) with water.

74. The method of claim 73 where the composition comprises less than about 5 volume percent water wherein the volume percent is based on the total amount of surfactants, diluent oil, and water present in the composition.

75. A method for cleaning an oil-coated substrate, the method comprising the sequential steps of:

(A) contacting at least a portion of the oil-coated substrate with a composition comprising:
(a) a nonpolar diluent oil;
(b) a polar diluent oil;
(c) a first surfactant having a HLB value of at least 10, the first surfactant being selected from the group consisting of polyoxyethylene (20) sorbitan trioleate, polyoxyethylene (20) sorbitan tristearate, and polyoxyethylene (4) sorbitan monolaurate; and
(d) a second surfactant having a higher HLB value, the second surfactant being selected from the group consisting of polyoxyethylene (20) sorbitan monooleate and polyoxyethylene (20) sorbitan monopalmitate, where the difference in HLB values of the first and second surfactants is at least 3, and the total concentration of the surfactants in the composition is about 5 to about 30 volume percent; and (B) rinsing at least a portion of the oil-coated substrate contacted in step (A) with water.

76. The method of claim 75 where the composition comprises less than about 5 volume percent water wherein the volume percent is based on the total amount of surfactants, diluent oil, and water present in the composition.

77. The method of claim 75 where the composition comprises less than about 10 volume percent of all ingredients other than the nonpolar diluent oil, the polar diluent oil, the first surfactant, and the second surfactant wherein the volume percent is based on the total volume of the composition.

78. The method of claim 75 where the nonpolar diluent oil is the major ingredient in the solution based upon the weight of each ingredient in the composition.

* * * * *

UNITED STATES PATENT AND TRADEMARK OFFICE
CERTIFICATE OF CORRECTION

PATENT NO. : 5,634,984
DATED : June 3, 1997
INVENTOR(S) : Donald C. Van Slyke

It is certified that error appears in the above-indentified patent and that said Letters Patent is hereby corrected as shown below:

Claim 20, line 45, column 30, replace "21" with -- 1 --.

Claim 41, line 27, column 32, replace "polyoxyethytene" with -- polyoxyethylene --.

Signed and Sealed this

Second Day of September, 1997

Attest:

BRUCE LEHMAN

Attesting Officer

Commissioner of Patents and Trademarks